(12) United States Patent
Ewens

(10) Patent No.: US 10,408,132 B2
(45) Date of Patent: Sep. 10, 2019

(54) SYSTEMS AND METHODS FOR ADAPTIVELY PURGING FUEL CIRCUITS

(71) Applicant: General Electric Company, Schenectady, NY (US)

(72) Inventor: David Spencer Ewens, Greer, SC (US)

(73) Assignee: General Electric Company, Schenectady, NY (US)

( * ) Notice: Subject to any disclaimer, the term of this patent is extended or adjusted under 35 U.S.C. 154(b) by 454 days.

(21) Appl. No.: 15/354,784

(22) Filed: Nov. 17, 2016

(65) Prior Publication Data

US 2018/0135530 A1    May 17, 2018

(51) Int. Cl.
*G06F 19/00*    (2018.01)
*F02C 7/232*    (2006.01)

(52) U.S. Cl.
CPC ........ *F02C 7/232* (2013.01); *F05D 2260/602* (2013.01); *F05D 2260/607* (2013.01); *F05D 2260/81* (2013.01)

(58) Field of Classification Search
CPC ............... F02C 7/232; F05D 2260/602; F05D 2260/607; F05D 2260/81
See application file for complete search history.

(56) References Cited

U.S. PATENT DOCUMENTS

| 7,950,238 B2 | 5/2011 | Iasillo et al. |
| 7,997,083 B2 | 8/2011 | Meadows et al. |
| 2003/0192300 A1* | 10/2003 | Mahoney ................ F02C 9/263 60/39.281 |
| 2013/0318993 A1* | 12/2013 | Erickson .................. F02C 7/22 60/779 |

* cited by examiner

*Primary Examiner* — Kidest Bahta
(74) *Attorney, Agent, or Firm* — Fletcher Yoder, P.C.

(57) ABSTRACT

A method includes instructing a purge valve of a gas turbine system to open, thereby purging a fuel circuit by filling the fuel circuit with purge gas, wherein the fuel circuit initially contains fuel. The method also includes generating a model of the gas turbine system that simulates a modeled output based on a model input corresponding to a measured input. The method further includes receiving a measured output of the gas turbine system. The method also includes adjusting the model input such that the modeled output more closely matches the measured output when the measured output is not approximately equal to the modeled output. The method further includes instructing the purge valve to open during a subsequent purge operation and a gas control valve to open more fully or at least partially close during the subsequent purge operation based at least in part on adjusting the model input.

19 Claims, 11 Drawing Sheets

SYSTEMS AND METHODS FOR ADAPTIVELY PURGING FUEL CIRCUITS

BACKGROUND

The present disclosure relates generally to fueling power generation systems. In particular, the present disclosure relates to purging fuel circuits of a power generation system.

A power generation system, such as a gas turbine system, may include multiple fuel circuits, some of which may be enabled and/or disabled during operation of the power generation system. When a fuel circuit is disabled, it may be purged (e.g., with an inert gas) to prevent a safety issue. If the fuel circuit contains unburned fuel, which can mix with air in the fuel circuit via backflow and/or diffusion through a fuel nozzle, purging the fuel circuit may prevent a flame/explosion hazard in the fuel circuit given a source of ignition. Additionally, residual fuel stored at high temperatures may form deposits or otherwise clog the fuel circuit. When a disabled fuel circuit is subsequently enabled, fuel may fill the fuel circuit and empty the inert purge gas before the fuel is delivered to a combustion system of the power generation system. This event is called prefill, and occurs in a finite duration of time.

The fuel exiting the fuel circuit during the purge event enters a combustion system of the power generation system. If the purged fuel is not compensated for by reducing a similar amount of fuel to the combustion system, then the power generation system will output undesired increased power due to the purged fuel. While the purge event may be compensated for by reducing fuel flow (e.g., via other fuel circuits) to the combustion system during the purge event, the amount of fuel flow reduction may vary over the life of the power generation system. This may be because components of the power generation system that introduce fuel to the combustion system may degrade or otherwise change from use and time. For example, gas control valve operating characteristics may change, or fuel circuit volumes, fuel nozzles, fuel passage components, and the like, may collect deposits and/or erode, changing characteristics related to fuel passage. Moreover, maintenance, cleaning, and restoration procedures may also change characteristics related to fuel passage.

BRIEF DESCRIPTION

Certain embodiments commensurate in scope with the originally claimed invention are summarized below. These embodiments are not intended to limit the scope of the claimed embodiments, but rather these embodiments are intended only to provide a brief summary of possible forms of the invention. Indeed, the presently claimed embodiments may encompass a variety of forms that may be similar to or different from the embodiments set forth below.

In a first embodiment, a gas turbine system includes multiple gas control valves coupled to a fuel supply, multiple purge valves coupled to a purge gas supply, multiple fuel circuits coupled to the multiple purge valves, a gas turbine that operates based on fuel received via the multiple fuel circuits, and a processor communicatively coupled to the multiple purge valves. The processor transmits instructions to a purge valve to open, thereby purging a fuel circuit by filling the fuel circuit with purge gas, wherein the fuel circuit initially contains fuel. The processor also generates a model of the gas turbine system that simulates a modeled output of the gas turbine system based on a model input corresponding to a measured input to the gas turbine system. The processor further receives a measured output of the gas turbine system after the purge valve opens. The processor also adjusts the model inputs to match the measured output when the measured output is not approximately equal to the modeled output. The processor further transmits instructions to the purge valve to open during a subsequent purge operation and a gas control valve to open more fully or at least partially close during the subsequent purge operation based at least in part on adjusting the model input.

In a second embodiment, a method includes instructing a purge valve of a gas turbine system to open, thereby purging a fuel circuit by filling the fuel circuit with purge gas, wherein the fuel circuit initially contains fuel. The method also includes generating a model of the gas turbine system that simulates a modeled output based on a model input corresponding to a measured input. The method further includes receiving a measured output of the gas turbine system. The method also includes adjusting the model input such that the modeled output more closely matches the measured output when the measured output is not approximately equal to the modeled output. The method further includes instructing the purge valve to open during a subsequent purge operation and a gas control valve to open more fully or at least partially close during the subsequent purge operation based at least in part on adjusting the model input.

In a third embodiment, one or more tangible, non-transitory, machine-readable media includes instructions that cause a processor to instruct a purge valve of a gas turbine system to open, thereby purging a fuel circuit of the gas turbine system by filling the fuel circuit with purge gas, wherein the fuel circuit initially contains fuel. The instructions also cause the processor to generate a model of the gas turbine system that simulates a modeled output of the gas turbine system based on a model input corresponding to a measured input to the gas turbine system. The instructions further cause the processor to receive a measured output of the gas turbine system. The instructions also cause the processor to adjust a model input to match the measured output when the measured output is not approximately equal to the modeled output. The instructions further cause the processor to instruct a purge valve to open and a gas control valve to open more fully or at least partially close based at least in part on adjusting the model input.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

Figure 1:
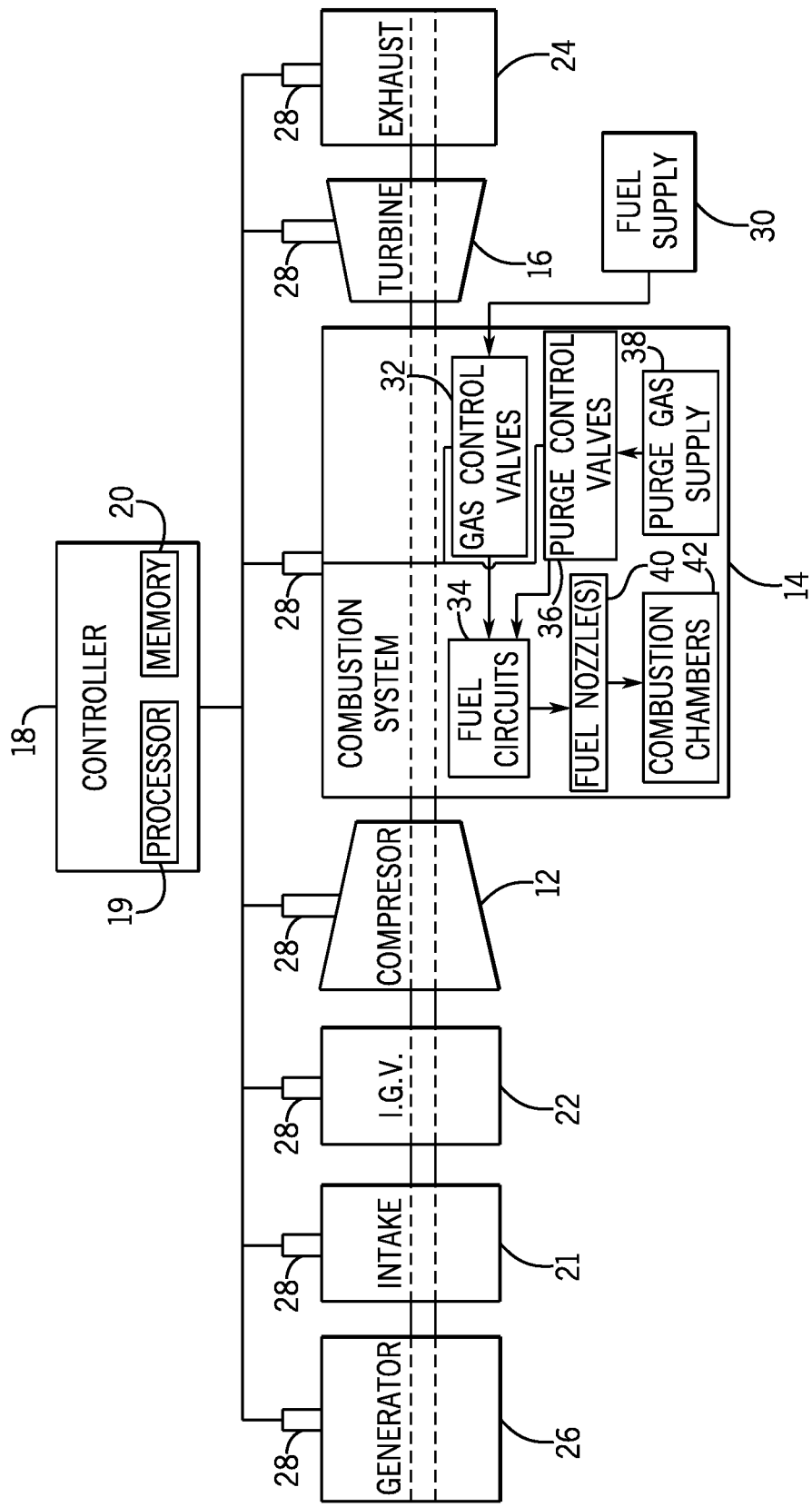
FIG. 1 is a block diagram of a power generation system, in accordance with an embodiment of the present disclosure.

One or more specific embodiments of the presently disclosed embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

The present disclosure describes systems and methods for adaptively purging one or more fuel circuits of a power generation system, such that fuel purged from the one or more fuel circuits may be adaptively compensated for over the life of the power generation system. A purge event may include positioning and/or operating one or more purge valves coupled to the one or more fuel circuits to enable inert purge gas to pass through the one or more control valves and purge fuel from the one or more fuel circuits. If the purged fuel is not compensated for by reducing a similar amount of fuel to the combustion system, then the power generation system will output undesired increased power due to the purged fuel. While the purge event may be compensated for by reducing fuel flow (e.g., via other fuel circuits) to the combustion system during the purge event, the amount of fuel flow reduction may vary over the life of the power generation system. The purge event may be evaluated using a model of the power generation system. The model may include one or more inputs that may be adaptively adjusted to approximately match one or more outputs of the model to one or more measured outputs of the power generation system. Adaptively adjusting the one or more inputs to the model during the purge event may provide, in real time, a basis for an adjustment to the fuel flow rate to compensate for the purged fuel received at a combustion system of the power generation system. The adjustment may then be used to compensate for the purged fuel, reducing the likelihood of providing excessive fuel to the combustion system, which may result in power generation inefficiency.

In one embodiment, a controller of the power generation system may purge a fuel circuit. The controller may also generate a model of the power generation system. The controller may then receive a measured power output of the power generation system. The controller may determine whether the measured power output is greater than a modeled output. If so, the controller may increase a fuel flow rate input to the model such that the modeled power output more closely matches the measured power output. During a subsequent purge of the fuel circuit, the controller may decrease a fuel flow rate of the power generation system based on increasing the fuel flow rate input to the model.

While the present disclosure discusses embodiments associated with a gas turbine system, it should be understood that that the systems and methods described in the present disclosure may apply to any suitable power generation system, such as a steam turbine system, wind turbine system, hydroturbine system, combustion engine, hydraulic engine, electric generator, and the like.

FIG. 1 is a block diagram of a power generation system (e.g., a gas turbine system 10) having a compressor 12, combustion system 14, turbine 16, and a controller 18, in accordance with an embodiment of the present disclosure. An intake duct 21 may feed ambient air to the compressor 12. The intake 21 may include ducts, filters, screens, and/or sound-absorbing devices that contribute to pressure loss of the ambient air flowing through the intake 21 into inlet guide vanes 22. An exhaust duct 24 may include sound-absorbing materials and emission control devices that apply a backpressure to the turbine 16. The amount of intake pressure loss and back pressure may vary over time due to the addition of components to and dust and dirt clogging the intake duct 21 and the exhaust duct 24. The turbine 16 may drive a generator 26 that produces electrical power.

The operation of the gas turbine system 10 may be monitored by one or more sensors 28 that may detect various observable conditions of one or more components of the gas turbine system 10 (e.g., the generator 26, the intake 21, etc.) and/or the ambient environment. In some embodiments, a plurality of redundant sensors may be used to measure the same measured condition. For example, a plurality of redundant temperature sensors 28 may monitor ambient temperature surrounding the gas turbine system 10, compressor discharge temperature, turbine exhaust gas temperature, and other temperature measurements of the gas stream through the gas turbine system 10. Similarly, a plurality of redundant pressure sensors 28 may monitor ambient pressure, and static and dynamic pressure levels at the intake duct 21, exhaust duct 24, and/or at other locations in the gas stream through the gas turbine system 10. A plurality of redundant humidity sensors 28 (e.g., wet and/or dry bulb thermometers) may measure ambient humidity in the intake duct 21. A plurality of redundant sensors 28 may also include flow sensors, speed sensors, flame detector sensors, valve position sensors, guide vane angle sensors, output power sensors, or the like, that sense various parameters pertinent to the operation of gas turbine system 10.

The controller 18 may include one or more computer systems or devices having one or more processors 19 (e.g., microprocessors) that may execute software programs to control the operation of the gas turbine system 10. The controller 18 may use sensor inputs and/or instructions from human operators. For example, the controller 18 may be communicatively coupled to the one or more sensors 28. Moreover, the processor(s) 19 may include multiple microprocessors, one or more "general-purpose" microprocessors, one or more special-purpose microprocessors, and/or one or more application specific integrated circuits (ASICS), or some combination thereof. For example, the processor(s) 19 may include one or more reduced instruction set (RISC) processors. The controller 18 may be coupled to one or more memory devices 20 that may store information such as control software, look up tables, configuration data, etc. In some embodiments, the processor(s) 19 and/or the memory device(s) 20 may be external to the controller 18. The memory device(s) 20 may include a tangible, non-transitory, machine-readable-medium, such as a volatile memory (e.g., a random access memory (RAM)) and/or a nonvolatile memory (e.g., a read-only memory (ROM)). The memory device(s) 20 may store a variety of information and may be used for various purposes. For example, the memory device(s) 20 may store machine-readable and/or processor-executable instructions (e.g., firmware or software) for the processor(s) 19 to execute, such as instructions for controlling the gas turbine system 10. The memory device(s) 20 may include one or more storage devices (e.g., nonvolatile storage devices) that may include read-only memory (ROM), flash memory, a hard drive, or any other suitable optical, magnetic, or solid-state storage medium, or a combination thereof.

The combustion system 14 powers the turbine 16 by mixing and igniting air and fuel. As illustrated, the fuel is provided by a fuel supply 30. The fuel flow rate to a combustion system 14 may be controlled by multiple gas control valves 32 and sensed by one or more sensors 28. Each gas control valve 32 is coupled to a respective fuel circuit 34. As such, during a prefill event for one or more fuel circuits 34, a fuel flow rate may be controlled by one or more gas control valves 32 coupled to the one or more fuel circuits 34. Each fuel circuit 34 is also coupled to a respective purge valve 36 that is in turn coupled to a purge gas supply 38. Each purge valve 36 may control a purge gas flow rate to the one or more fuel circuits 34. The purge gas provided by the purge gas supply 38 may be any suitable non-fuel purge gas, such as anything other than a combustible fuel. For example, the purge gas may include an oxidant (e.g., air, oxygen, or mixtures thereof), an inert gas (e.g., a fully inert gas such as nitrogen), and the like.

The one or more fuel circuits 34 are coupled to one or more fuel nozzles 40, which deliver the fuel in the one or more fuel circuits 34 to a combustion chamber 42 of the combustion system 14. The combustion chamber 42 mixes and ignites the fuel with air, which powers the turbine 16.

Figure 2:
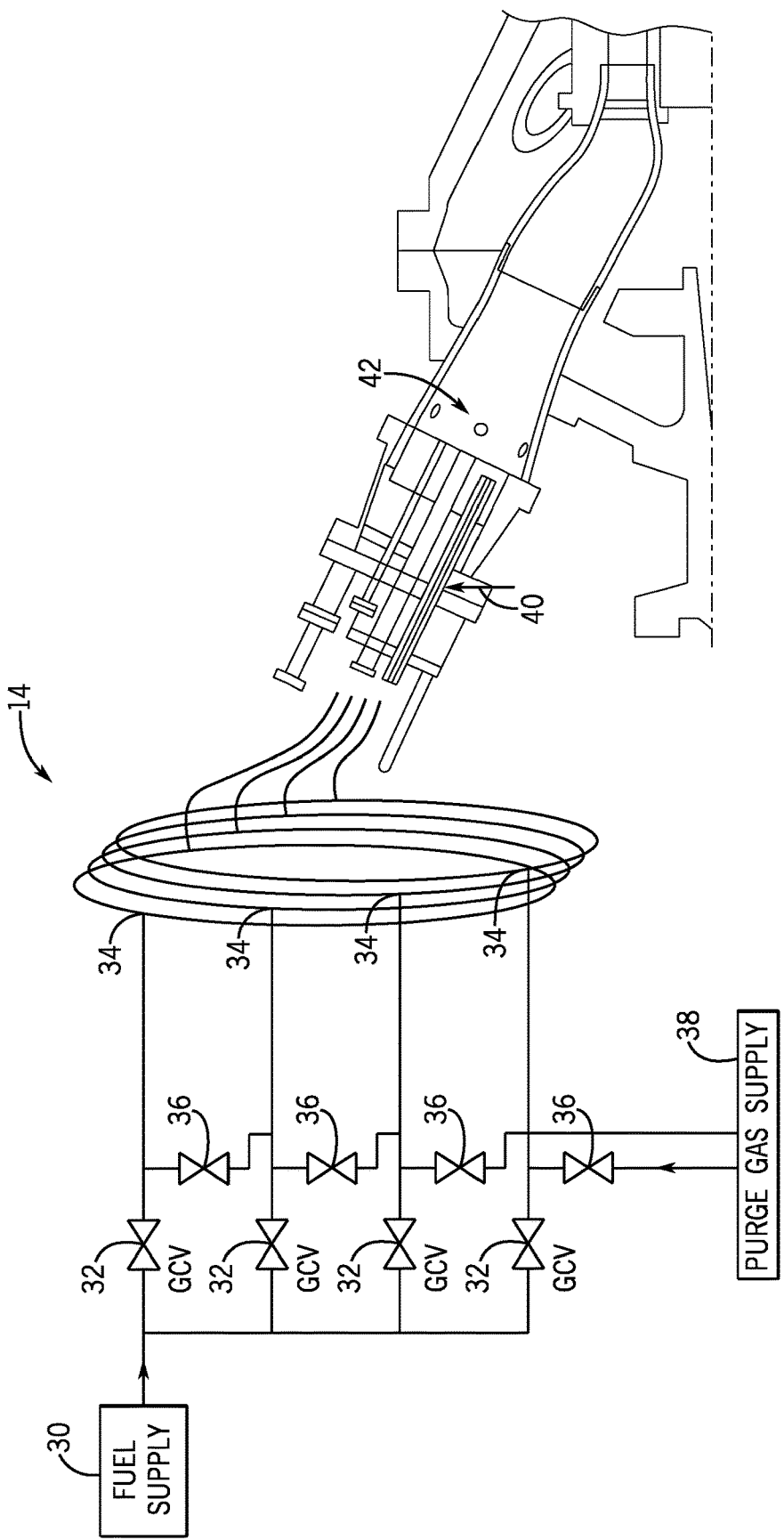
FIG. 2 is a diagram of a combustion system of the power generation system of FIG. 1, in accordance with an embodiment of the present disclosure.

FIG. 2 is a diagram of the combustion system 14 of the gas turbine system 10 of FIG. 1, in accordance with an embodiment of the present disclosure. As illustrated the combustion system 14 includes four fuel circuits 34 that are arranged in approximately concentric circles that wrap around a portion (e.g., including the fuel nozzle 40 and the combustion chamber 42) of the combustion system 14. Each fuel circuit 34 is coupled to a respective gas control valve 32 and a respective purge valve 36. Each gas control valve 32 and each purge valve 36 may be controlled by the controller 18. Each gas control valve 32 is coupled to the fuel supply 30, and each purge valve 36 is coupled to the purge gas supply 38. While FIG. 2 illustrates four fuel circuits 34, four associated gas control valves 32, and four respective purge valves 36, it should be understood that the present disclosure applies to power generation systems having fewer or more fuel circuits 34, associated gas control valves 32, and purge valves 36.

Prefilling Fuel Circuits

When the fuel circuit 34 is disabled, it may be purged (e.g., with an inert gas) to prevent residual fuel from forming a deposit or otherwise clogging the fuel circuit 34. When a disabled fuel circuit 34 is subsequently enabled, fuel may fill the fuel circuit 34 and empty the inert purge gas before the fuel is delivered to a combustion system 14 of the gas turbine system 10. This event is called prefill, and occurs in a finite duration of time.

Figure 3:
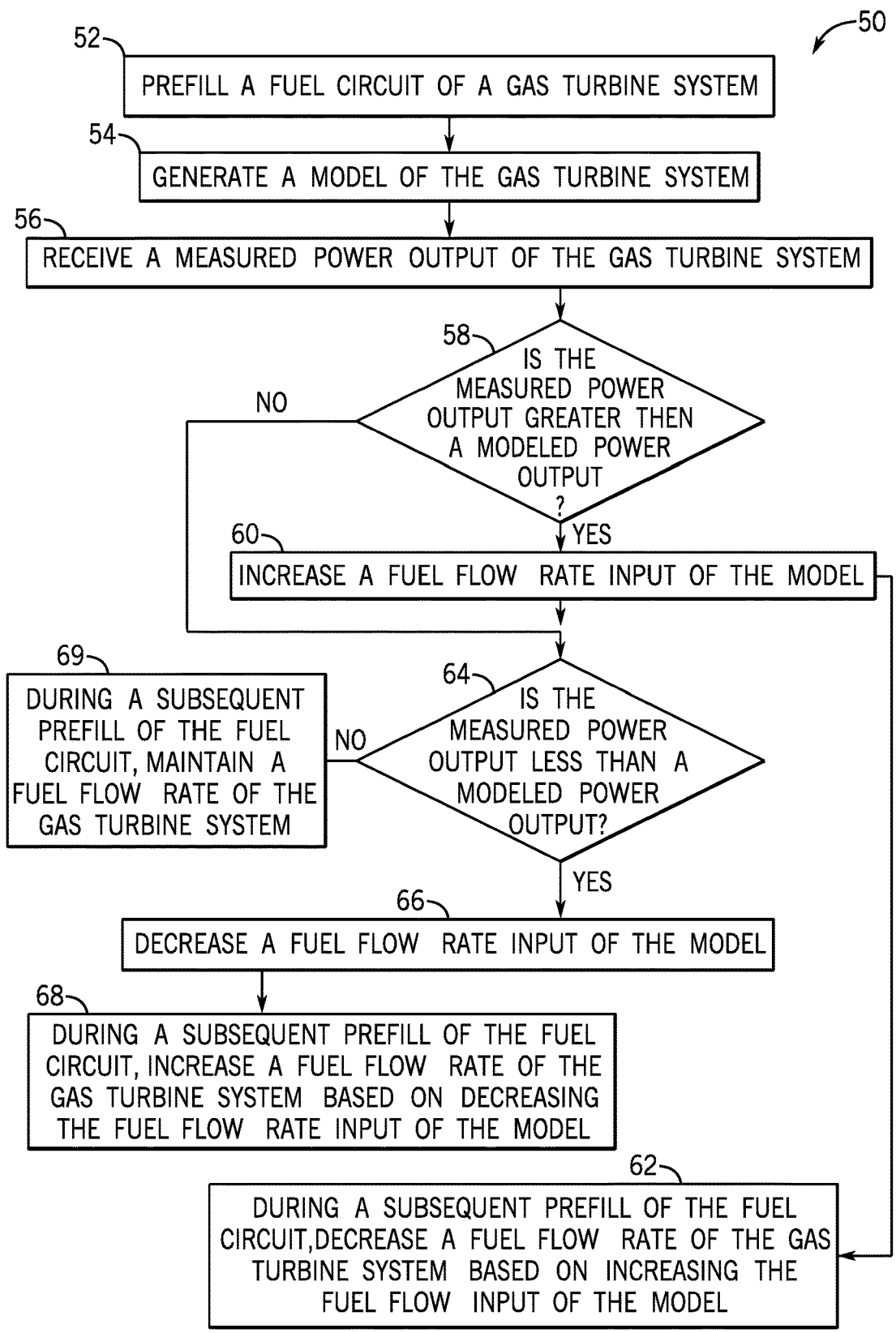
FIG. 3 is a flow diagram of a method for adaptively prefilling fuel circuits of the power generation system of FIG. 1, in accordance with an embodiment of the present disclosure.

FIG. 3 is a flow diagram of a method 50 for adaptively prefilling fuel circuits 34 of the gas turbine system 10 of FIG. 1, in accordance with an embodiment of the present disclosure. The method 50 may be performed by any suitable device that may control components of the gas turbine system 10, such as the controller 18. While the method 50 is described using steps in a specific sequence, it should be understood that the present disclosure contemplates that the describe steps may be performed in different sequences than the sequence illustrated, and certain described steps may be skipped or not performed altogether. In some embodiments, the method 50 may be implemented by executing instructions stored in a tangible, non-transitory, computer-readable medium, such as the memory device(s) 20, using a processor, such as the processor(s) 19.

The controller 18 may prefill (process block 52) a fuel circuit 34 of the gas turbine system 10. In some embodiments, the controller 18 may instruct the corresponding gas control valve 32 to open to prefill the fuel circuit 34. In some embodiments, more than one fuel circuit 34 may be prefilled based on the instruction from the controller 18. The controller 18 may instruct one or more gas control valves 32 to open in response to a request to prefill the one or more fuel circuits 34 of the gas turbine system 10.

The controller 18 may then generate (process block 54) a model of the gas turbine system 10. The model may simulate one or more outputs of the gas turbine system 10. The model may also include one or more model inputs corresponding to one or more inputs to the gas turbine system 10. The one or more outputs of the gas turbine system 10 may include, but are not limited to, generator or power output, exhaust temperature (e.g., turbine exhaust temperature), compressor condition (e.g., compressor pressure ratio), and the like. The one or more inputs to the gas turbine system 10 may include, for example, and without limitation, fuel flow rate, ambient conditions, angle of the inlet guide vanes 22, amount of fuel flowing to the combustion system 14, rotational speed of the gas turbine system 10, and the like. When using the fuel flow rate as the one or more inputs to the gas turbine system 10, for example, the fuel flow rate may be determined when commissioning the gas turbine system 10 or a component of the gas turbine system 10 (e.g., the turbine 16). In some embodiments, the fuel flow rate may be determined by modeling operation of the gas turbine system 10.

Figure 4:
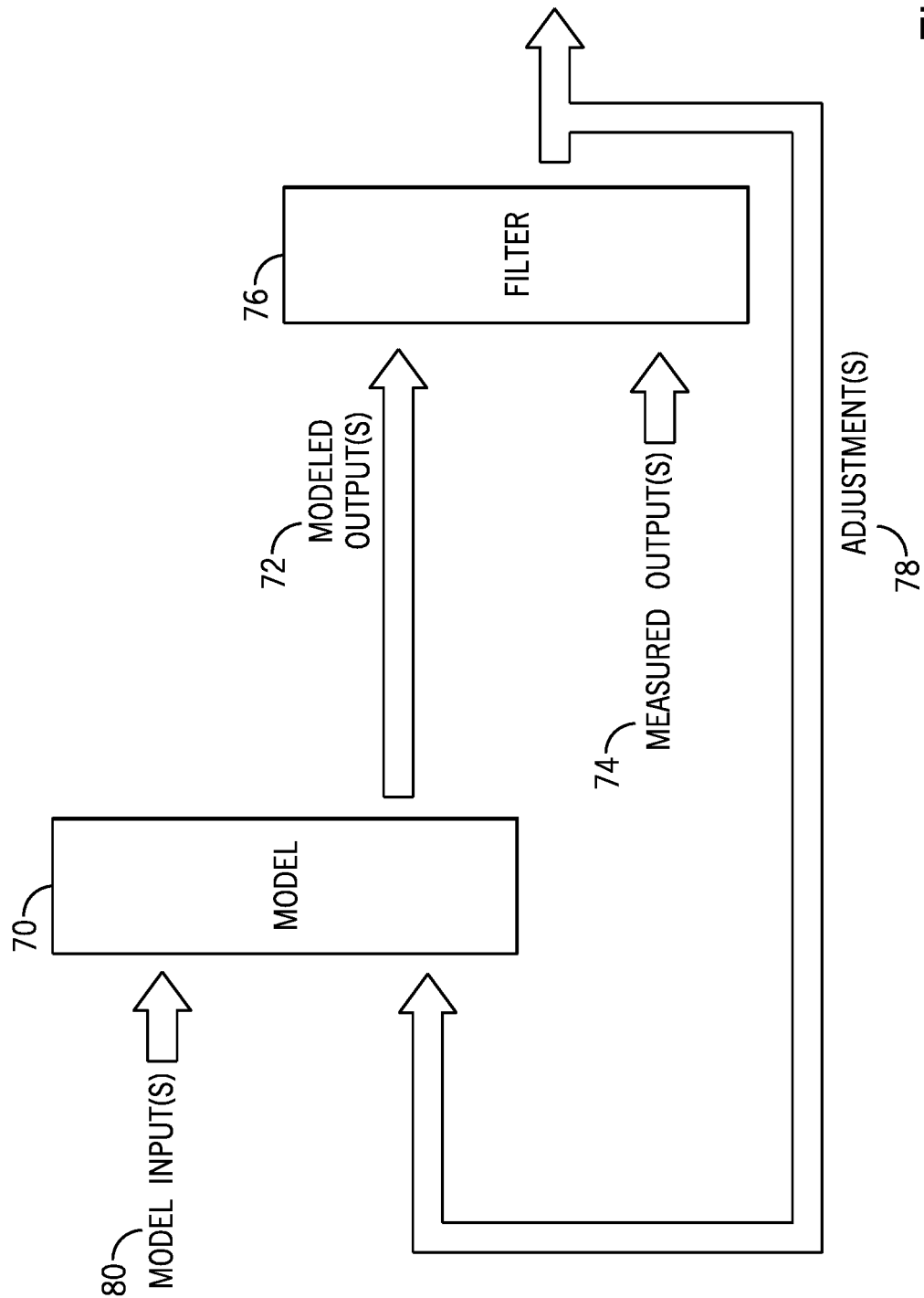
FIG. 4 is a block diagram of an example model for simulating operation of the power generation system of FIG. 1.

By way of example, FIG. 4 is a block diagram of an example model 70 for simulating operation of the gas turbine system 10 of FIG. 1 as provided in process block 54.

The model 70 may be a physics-based software model, and more particularly an adaptive real-time engine simulation (ARES) model. As illustrated, the model 70 simulates the one or more outputs of the gas turbine system 10 by outputting the one or more model outputs 72. The one or more model outputs 72 may include, but are not limited to, generator or power output, exhaust temperature (e.g., turbine exhaust temperature), compressor condition (e.g., compressor pressure ratio), and the like.

As mentioned above, the one or more inputs 80 to the model 70 may include, for example, and without limitation, ambient conditions, angle of the inlet guide vanes 22, amount of fuel flowing to the combustion system 14, rotational speed of the gas turbine system 10, and the like. For example, when using the fuel flow rate as the input to the gas turbine system 10, the one or more inputs 80 to the model 70 may correspondingly include the fuel flow rate.

Returning to FIG. 3, the controller 18 may receive (process block 56) a measured power output of the gas turbine system 10. The measured power output is used as an example of any one or more measured outputs of the gas turbine system 10, as described above, that may be received by the controller 18. The one or more measured outputs of the gas turbine system 10 may be provided by the sensor(s) 28 of the gas turbine system 10.

The controller 18 may then determine (decision block 58) whether the measured power output is greater than a modeled power output (e.g., provided by the model 70). In some embodiments, other and/or additional measured outputs of the gas turbine system 10 may be compared to other modeled outputs. Moreover, the controller 18 may alternatively or additionally determine whether measured power output is less than, approximately equal to, or approximately not equal to the modeled power output.

If the measured power output is greater than a modeled power output (decision block 58), then the controller 18 may increase (process block 60) a fuel flow rate input (e.g., 80) of the model 70. The fuel flow rate input is used as an example of any one or more inputs to the model 70 as described above. For example, the controller 18 may increase the fuel flow rate input of the model 70 such that the modeled power output is approximately equal to the modeled power output.

As illustrated in FIG. 4, the modeled output(s) 72 and the measured output(s) 74 may be input into an error correction system or filter 76 (e.g., a Kalman filter gain matrix) that automatically and regularly adjusts or tunes the model 70 (e.g., the one or more inputs 80 to the model 70) to more accurately fit the modeled output(s) 72 to the measured output(s) 74 of the gas turbine system 10.

The controller 18 may later receive a request to prefill the fuel circuit 34. For example, the fuel circuit 34 may be purged, and it may be desired to once again use the fuel circuit 34. During this subsequent prefill, the controller 18 may decrease (process block 62) a fuel flow rate of the gas turbine system 10 based on increasing the fuel flow input of the model. The fuel flow rate is used as an example of any one or more inputs to the gas turbine system 10 as described above. In some embodiments, the controller 18 may decrease the fuel flow rate by decreasing the prefill rate of the gas control valve 32. The controller 18 may also or alternatively decrease the fuel flow rate in the fuel circuits 34 associated with other gas control valves 32. For example, the controller 18 may instruct one or more gas control valve 32 to decrease the fuel flow rate of the gas turbine system 10 to compensate for the increase in the fuel flow input of the model.

As illustrated in FIG. 4, the filter 76 may output the one or more adjustments 78 that may be applied to the one or more inputs 80 such that the one or more modeled outputs 72 more closely matches the one or more measured outputs 74 of the gas turbine system 10. For example, when using the fuel flow rate as the input to the gas turbine system 10, the one or more adjustments 78 may include a fuel flow rate adjustment that results in decreasing, increasing, or maintaining (e.g., not changing) the fuel flow rate. In some embodiments, the filter 76 may use partial derivative analysis and/or normalization to determine a matrix of optimal tuning or gain values to be applied to the difference signals. The matrix may then generate the one or more adjustments 78.

If the measured power output is not greater than the modeled power output (decision block 58), then the controller 18 may determine (decision block 64) whether the measured power output is less than a modeled power output (e.g., provided by the model 70). In some embodiments, other and/or additional measured outputs of the gas turbine system 10 may be compared to other modeled outputs.

If the measured power output is less than the modeled power output (decision block 64), then the controller 18 may decrease (process block 66) the fuel flow rate input of the model 70. For example, the controller 18 may decrease the fuel flow rate input of the model 70, such that the modeled power output more closely matches the modeled power output.

The controller 18 may later receive a request to prefill the fuel circuit 34. During this subsequent prefill, the controller 18 may increase (process block 68) a fuel flow rate of the gas turbine system 10 based on decreasing the fuel flow input of the model. In some embodiments, the controller 18 may increase the fuel flow rate by increasing the prefill rate of the gas control valve 32. The controller 18 may also or alternatively increase the fuel flow rate in the fuel circuits 34 associated with other gas control valves 32. For example, the controller 18 may instruct one or more gas control valve 32 to increase the fuel flow rate of the gas turbine system 10 to compensate for the decrease in the fuel flow input of the model.

If the measured power output is not less than the modeled power output (decision block 64), then the controller 18 may, during the subsequent prefill of the fuel circuit 34, maintain (process block 69) the fuel flow rate of the gas turbine system 10. For example, the controller may not instruct the other one or more gas control valves 32 to adjust (e.g., increase or decrease) the fuel flow rate, such that the fuel flow rate for the subsequent prefill approximately matches the fuel flow rate for the initial prefill (as used in process block 52).

In this manner, the controller 18 may adaptively prefill the one or more fuel circuits 34 of the gas turbine system 10, such that a target (e.g., appropriate or desired) fuel flow rate may be provided over the life of the gas turbine system 10.

Figure 5:
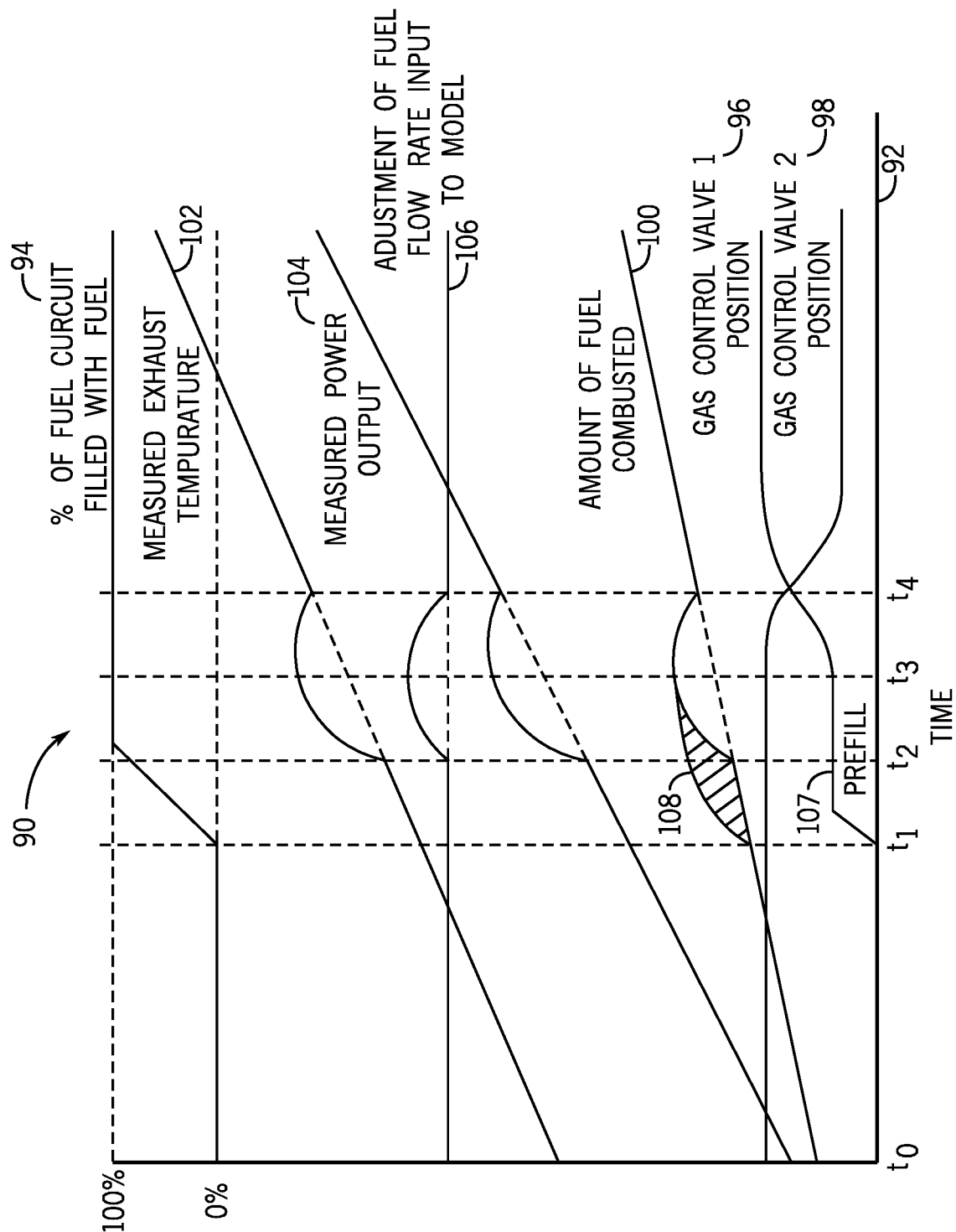
FIG. 5 is a graph of operational characteristics of the power generation system of FIG. 1 when a fuel circuit is prefilled with an excessive fuel flow rate, in accordance with an embodiment of the present disclosure.

FIG. 5 is a graph 90 of operational characteristics of the gas turbine system 10 of FIG. 1 when a fuel circuit 34 is prefilled with an excessive fuel flow rate, in accordance with an embodiment of the present disclosure. The graph 90 illustrates how an adjustment to a fuel flow rate to the gas turbine system 10 is generated to more closely compensate for undesirable increases in measured exhaust temperature and/or power output when the fuel circuit 34 is prefilled with an excessive fuel flow rate.

The horizontal axis 92 of the graph 90 represents time. At an initial time $t_0$, the fuel circuit 34 of the gas turbine system 10, a percentage of which may be filled fuel as represented by a first curve 94, is purged and thus does not contain fuel. A second curve 96 represents operation and/or a position of a first gas control valve 32 coupled to the fuel circuit 34 that controls fuel to the fuel circuit 34. As illustrated, at the initial time $t_0$, the first gas control valve 32 is turned off, and thus fuel does not flow through the first gas control valve 32 to the fuel circuit 34. A second gas control valve 32, whose operation and/or position is represented by a third curve 98, is at least partially open and enables fuel to flow to a corresponding fuel circuit 34. As such, fuel flows to the combustion system 14 of the gas turbine system 10 via the second gas control valve 32, such that the combustion chamber 42 combusts the fuel and powers the turbine 16 of the gas turbine system 10. The amount of fuel combusted by the combustion chamber 42 is represented by a fourth curve 100. As illustrated by the fourth curve 100, the fuel flow rate to the gas turbine system 10 is increased at a constant rate between times $t_0$ and $t_1$. A fifth curve 102 (representing exhaust temperature) and a sixth curve 104 (representing power output) represent the one or more outputs 72 of the gas turbine system 10. As illustrated by the fifth and sixth curves 102, 104, because the fuel flow rate to the combustion system 14 is increased at a constant rate between times $t_0$ and $t_1$, the exhaust temperature and the power output of the gas turbine system 10 also increase at a constant rate. A seventh curve 106 represents adjustment of the one or more inputs 80 (e.g., a fuel flow rate input) of the model 70 of the gas turbine system 10.

At time $t_1$, prefilling the fuel circuit 34 coupled to the first gas control valve 32 begins (e.g., in response to an instruction sent by the controller 18). As such, between times $t_1$ and $t_2$ (when the fuel circuit 34 coupled to the second gas control valve 32 is full of fuel), the controller 18 instructs the first gas control valve 32 to open at a position 107 corresponding to prefilling the associated fuel circuit 34 (as illustrated in the second curve 96) and fuel flows into and fills the associated fuel circuit 34 (as illustrated in the first curve 94). As illustrated, the controller 18 instructs the second gas control valve 32 (as illustrated in the third curve 98) to maintain its operation and/or position during this time period. Because the fuel passing through the first gas control valve 32 flows into the associated fuel circuit 34 and not yet to the combustion system 14, the amount of fuel combusted by the combustion chamber 42 (as illustrated in the fourth curve 100) remains increasing at a constant rate between times $t_1$ and $t_2$, as do the exhaust temperature (as illustrated in the fifth curve 102) and the power output (as illustrated in the sixth curve 104) between times $t_1$ and $t_2$. A difference between a total fuel flow (which includes the fuel filling the fuel circuit 34 and the fuel flowing at the fuel flow rate commanded by the controller 18 to the combustion system 14) and the fuel flowing at the fuel flow rate commanded by the controller 18 to the combustion system 14 is illustrated by the region 108. Until the fuel circuit 34 is filled, at time $t_2$, the one or more modeled outputs 72 (e.g., the exhaust temperature and power output) match the one or more measured outputs 74, and as such, no adjustments (as illustrated in the seventh curve 106) are made by the model 70 between times $t_1$ and $t_2$.

At time $t_2$, prefilling the fuel circuit 34 is complete (as illustrated in the first curve 94). Typically, for efficient operation, the controller 18 may send an instruction the first gas control valve 32 to open more fully, thereby stopping prefilling the fuel circuit 34, while instructing the second gas control valve 32 to partially close, such that fuel is provided by both the first and second gas control valves 32 to the combustion system 14. However, as illustrated by the fourth curve 100 between times $t_2$ and $t_4$, the combustion system 14 receives fuel at an excessive fuel flow rate. That is, the controller 18 continues to prefill the fuel circuit 34 (e.g., by maintaining the first gas control valve in a prefill position 107) until time $t_3$ despite the fuel circuit 34 being completely filled, while the second gas control valve 32 also maintains its operation and/or position. As illustrated in the time period before time $t_2$, the fuel flowing through the second gas control valve 32 (as illustrated in the third curve 98) to the combustion system 14 enables the constant and efficient level of outputs represented by the fifth and sixth curves 102, 104. However, because the fuel circuit 34 is completely filled by time $t_2$, fuel resulting from the continued prefill event flowing through the first gas control valve 32 also flows to the combustion system 14. As such, the amount of fuel combusted (as illustrated in the fourth curve 100) undesirably increases and, as a result, the exhaust temperature (as illustrated in the fifth curve 102) and the power output (as illustrated in the sixth curve 104) undesirably increase beyond the previous constantly increasing rates. The controller 18 receives the undesired increases of the one or more measured outputs 74 (e.g., the exhaust temperature and power output) of the gas turbine system 10, and adjusts one or more inputs 80 of the model 70 such that the one or more modeled outputs 72 match the undesired one or more measured outputs 74. For example, the controller 18 may increase (as illustrated in the seventh curve 106) a fuel flow rate such that the increases in the modeled exhaust temperature and power output (e.g., 72) match the undesired measured increases of the measured exhaust temperature and power output (e.g., 74) of the gas turbine system 10. In some embodiments, the measured increases may be received from the one or more sensors 28.

At time $t_3$, the prefill event ends (e.g., based on an instruction sent by the controller 18). As illustrated, the first gas control valve 32 opens more fully and beyond the prefill position 107 (as illustrated in the second curve 96) while the second gas control valve 32 partially closes (as illustrated in the third curve 98), such that fuel is provided by both the first and second gas control valves 32 to the combustion system 14. As such, the amount of fuel combusted (as illustrated in the fourth curve 100) begins to decrease to the previous constantly increasing rate (reached at time $t_4$) and, as a result, the exhaust temperature (as illustrated in the fifth curve 102) and the power output (as illustrated in the sixth curve 104) also decrease to their respective previous constantly increasing rates (reached at time $t_4$). The controller 18 receives the measured decreases of the one or more outputs 72 (e.g., the exhaust temperature and power output) of the gas turbine system 10, and adjusts the one or more inputs 80 of the model 70 such that the one or more modeled outputs 72 match these one or more measured outputs 74. For example, the controller 18 may decrease (as illustrated in the seventh curve 106) a fuel flow rate of the model 70 such that the decreases in the modeled exhaust temperature and power output (e.g., 72) match the decreases of the measured exhaust temperature and power output (e.g., 74) of the gas turbine system 10.

At time $t_4$, while position and/or operation of the first and second gas control valves 32 may be changing (as illustrated in the second and third curves 96, 98), the amount of fuel combusted (as illustrated in the fourth curve 100) has reached to the previous constantly increasing rate. As such, the exhaust temperature (as illustrated in the fifth curve 102) and the power output (as illustrated in the sixth curve 104) also reach their respective previous constantly increasing rates. The controller 18 receives the status of the one or more outputs 72 (e.g., the exhaust temperature and power output) of the gas turbine system 10, and adjusts the one or more inputs 80 of the model 70 such that the one or more modeled outputs 72 match these one or more measured outputs 74. For example, the controller 18 may decrease (as illustrated in the seventh curve 106) a fuel flow rate of the model 70 such that the decreases in the modeled exhaust temperature and power output (e.g., 72) match the decreases of the measured exhaust temperature and power output (e.g., 74) of the gas turbine system 10 to the efficient operational parameters.

Based on the adjustments made to the one or more inputs 80 (e.g., the fuel flow rate) of the model 70, the controller 18 may adjust a subsequent prefill of the fuel circuit 34. For example, during the next prefill of the fuel circuit 34, the controller 18 may decrease the fuel flow rate between times $t_2$ and $t_4$ based on adjustments made to decrease a fuel flow rate input (e.g., 80) to the model 70 to account for the increases to the modeled exhaust temperature and power output (e.g., 72). In this manner, the controller 18 may adaptively prefill the fuel circuit 34 of the gas turbine system 10, such that a target fuel flow rate may be provided over the life of the gas turbine system 10.

Figure 6:
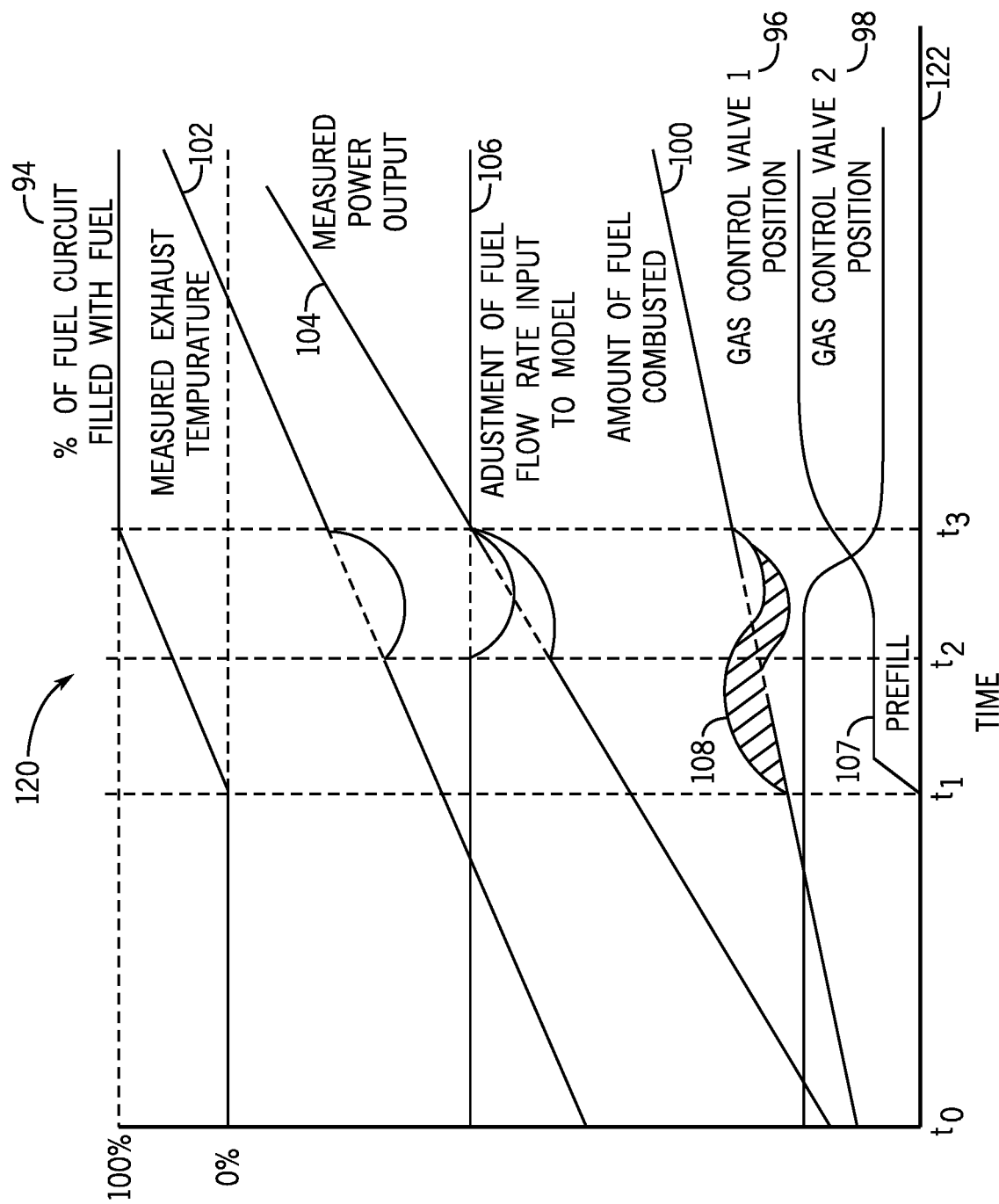
FIG. 6 is a graph of operational characteristics of the power generation system of FIG. 1 when a fuel circuit is prefilled with an insufficient fuel flow rate, in accordance with an embodiment of the present disclosure.

FIG. 6 is a graph 120 of operational characteristics of the gas turbine system 10 of FIG. 1 when a fuel circuit 34 is prefilled with an insufficient fuel flow rate, in accordance with an embodiment of the present disclosure. The graph 120 illustrates how an adjustment to a fuel flow rate to the gas turbine system 10 is generated to more closely match undesirable decreases in measured exhaust temperature and/or power output when the fuel circuit 34 is prefilled with an insufficient fuel flow rate.

The horizontal axis 122 of the graph 120 represents time. At an initial time $t_0$, the fuel circuit 34 of the gas turbine system 10, represented by a first curve 94, is purged and does not contain fuel. A second curve 96 represents operation and/or a position of a first gas control valve 32 coupled to the fuel circuit 34 that controls fuel to the fuel circuit 34. As illustrated, at the initial time $t_0$, the first gas control valve 32 is turned off, and thus fuel is not flowing through the first gas control valve 32 to the fuel circuit 34. A second gas control valve 32, whose operation and/or position is represented by a third curve 98, is at least partially open and enables fuel to flow to a corresponding fuel circuit 34. As such, fuel flows to the combustion system 14 via the second gas control valve 32, such that the combustion chamber 42 combusts the fuel. The amount of fuel combusted by the combustion chamber 42 is represented by a fourth curve 100. As illustrated by the fourth curve 100, the fuel flow rate to the combustion system 14 is increased at a constant rate. A fifth curve 102 (representing exhaust temperature) and a sixth curve 104 (representing power output) represent the one or more outputs 72 of the gas turbine system 10. As illustrated by the fifth and sixth curves 102, 104, because the fuel flow rate to the combustion system 14 is increased at a constant rate, the exhaust temperature and the power output of the gas turbine system 10 also increase at a constant rate. A seventh curve 106 represents adjustment of the one or more inputs 80 of the model 70 of the gas turbine system 10.

At time $t_1$, prefilling the fuel circuit 34 coupled to the first gas control valve 32 begins (e.g., based on an instruction sent by the controller 18). As such, between time $t_1$ and time $t_2$ (when the prefill event ends), the first gas control valve 32 opens at a position 107 corresponding to prefilling the fuel circuit 34 (as illustrated in the second curve 96) and fuel flows into and fills the fuel circuit 34 (as illustrated in the first curve 94). As illustrated, the second gas control valve 32 (as illustrated in the third curve 98) maintains its operation and/or position during this time period. Because the fuel passing through the first gas control valve 32 flows into the fuel circuit 34 and not yet to the combustion system 14, the amount of fuel combusted by the combustion chamber 42 (as illustrated in the fourth curve 100) remains increasing at a constant rate over this time period, as do the exhaust temperature (as illustrated in the fifth curve 102) and the power output (as illustrated in the sixth curve 104). A difference between a total fuel flow (which includes the fuel filling the fuel circuit 34 and the fuel flowing at the fuel flow rate commanded by the controller 18 to the combustion system 14) and the fuel flowing at the fuel flow rate commanded by the controller 18 combustion system 14 is illustrated by the region 108. Until the corresponding fuel circuit 34 is filled, at time $t_2$, the one or more outputs 72 (e.g., the exhaust temperature and power output) of the gas turbine system 10 are proceeding as modeled, and as such, no adjustments (as illustrated in the seventh curve 106) are made by the model 70.

At time $t_2$, the prefill event ends (e.g., based on an instruction sent by the controller 18), as illustrated in the first curve 94. As such, the controller 18 instructs the first gas control valve 32 to close, thereby stopping prefilling the fuel circuit 34, and open more fully while instructing the second gas control valve 32 to partially close, to provide fuel from both the first and second gas control valves 32 to the combustion system 14. However, as illustrated, the combustion system 14 receives fuel at an insufficient fuel flow rate. That is, the controller 18 stops prefilling the fuel circuit 34 after time $t_2$ despite the fuel circuit 34 not being completely filled, while the fuel flowing through the second gas control valve 32 decreases. As illustrated in the time period before time $t_2$, the fuel flowing through the second gas control valve 32 to the combustion system 14 enables the constantly increasing rates of outputs represented by the fifth and sixth curves 102, 104. However, because the fuel circuit 34 is not yet completely filled and fuel flowing through the second gas control valve 32 decreases, the combustion system 14 receives less fuel than commanded (e.g., by the controller 18). That is, the combustion system 14 does not receive fuel from the fuel circuit 34 because it is not yet completely filled, and the combustion system 14 receives less fuel through the second gas control valve 32 because it begins to at least partially close due to the prefill event ending. As such, the amount of fuel combusted (as illustrated in the fourth curve 100) undesirably decreases and, as a result, the exhaust temperature (as illustrated in the fifth curve 102) and the power output (as illustrated in the sixth curve 104) undesirably decrease below their respective constantly increasing rates. The controller 18 receives the undesired decreases of the one or more measured outputs 72 (e.g., the exhaust temperature and power output) of the gas turbine system 10, and adjusts one or more inputs 80 of the model 70 such that the one or more modeled outputs (e.g., 72) match the undesired decreases of the one or more measured outputs 72. For example, the controller 18 may decrease (as illustrated in the seventh curve 106) a fuel flow rate such that the decreases in the modeled exhaust temperature and power output (e.g., 72) match the undesired decreases of the measured exhaust temperature and power output (e.g., 74) of the gas turbine system 10. In some embodiments, the decreases of the measured exhaust temperature and power output (e.g., 74) may be received from the one or more sensors 28.

At time $t_3$, the fuel circuit 34 is completely filled (as illustrated in the first curve 94), and the position and/or operation of the first and second gas control valves 32 (as illustrated in the second and third curves 96, 98) have reached steady states. As such, the amount of fuel combusted (as illustrated in the fourth curve 100) has reached the previous constantly increasing rates, and, as a result, the exhaust temperature (as illustrated in the fifth curve 102) and the power output (as illustrated in the sixth curve 104) also reach their respective previous constantly increasing rates. The controller 18 receives the status of the one or more outputs 72 (e.g., the exhaust temperature and power output) of the gas turbine system 10, and adjusts the one or more inputs 80 of the model 70 such that the one or more modeled outputs 72 match the one or more measured outputs 74. For example, the controller 18 may increase (as illustrated in the seventh curve 106) a fuel flow rate of the model 70 such that the decreases in the modeled exhaust temperature and power output (e.g., 72) match the increases of the measured exhaust temperature and power output (e.g., 74) of the gas turbine system 10 to the efficient operational parameters.

Based on the adjustments made to the one or more inputs 80 (e.g., the fuel flow rate) of the model 70, the controller 18 may adjust a subsequent prefill of the fuel circuit 34. For example, during the next prefill of the fuel circuit 34, the controller 18 may increase the fuel flow rate between times $t_2$ and $t_3$ based on adjustments made to increase a fuel flow rate input (e.g., 80) to the model 70 to account for the decreases to the modeled exhaust temperature and power output (e.g., 72) as illustrated in the seventh curve 106 of FIG. 5. In this manner, the controller 18 may adaptively prefill the fuel circuit 34 of the gas turbine system 10, such that a target fuel flow rate may be provided over the life of the gas turbine system 10.

Figure 7:
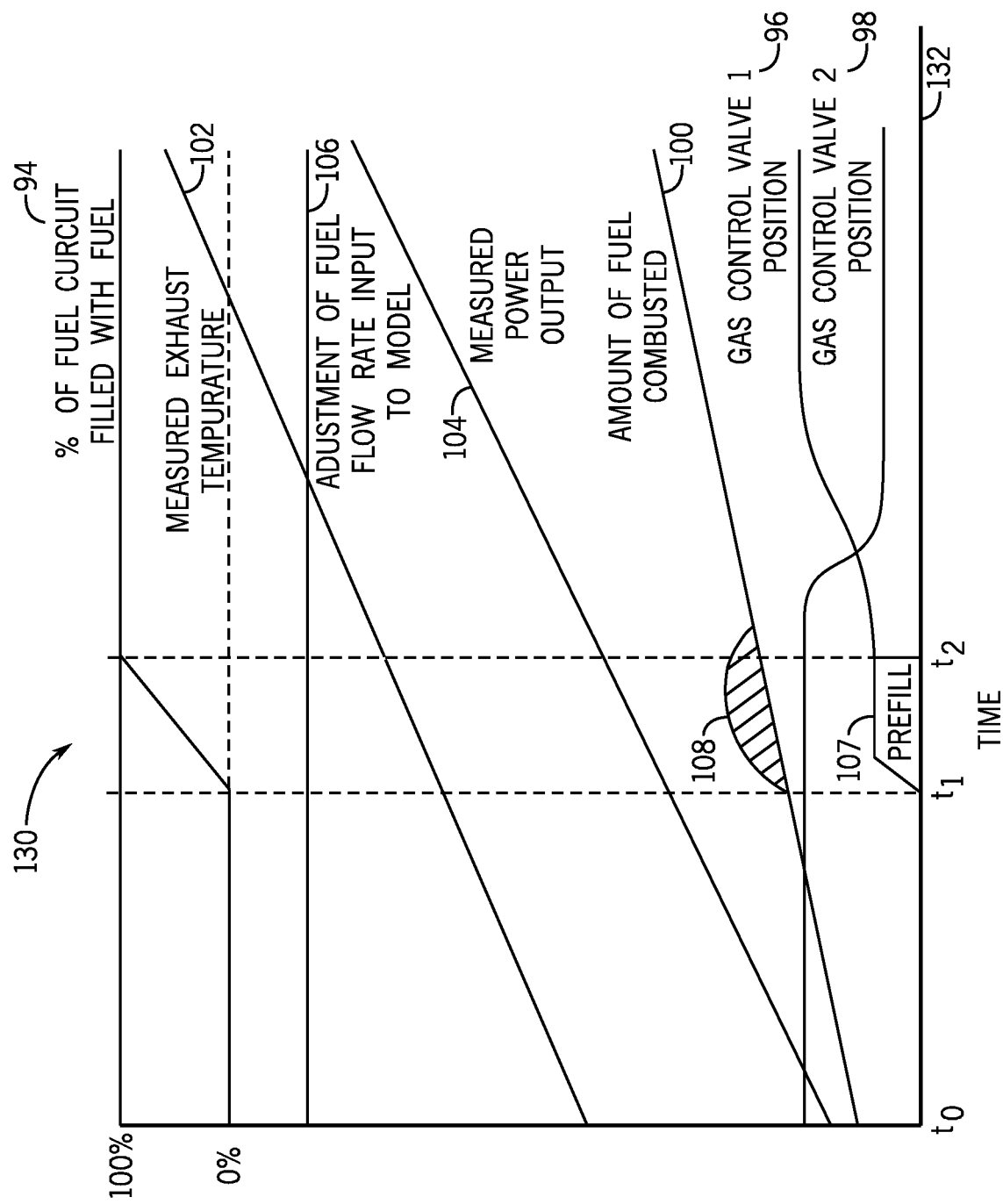
FIG. 7 is a graph of operational characteristics of the power generation system of FIG. 1 when a fuel circuit is prefilled with a target fuel flow rate, in accordance with an embodiment of the present disclosure.

FIG. 7 is a graph 130 of operational characteristics of the gas turbine system 10 when a fuel circuit 34 is prefilled with a target (e.g., appropriate or desired) fuel flow rate, in accordance with an embodiment of the present disclosure. The graph 130 illustrates that no adjustment is made to a constant fuel flow rate to the gas turbine system 10 because the measured exhaust temperature and/or power output also stay constant when the fuel circuit 34 is prefilled with a target fuel flow rate.

The graph 130 may represent a subsequent prefill of the fuel circuit after the controller 18 has adjusted the fuel flow rate based on previously prefilling the fuel circuit 34. The horizontal axis 132 of the graph 130 represents time. At an initial time $t_0$, the fuel circuit 34 of the gas turbine system 10, represented by a first curve 94, is purged and does not contain fuel. A second curve 96 represents operation and/or a position of a first gas control valve 32 coupled to the fuel circuit 34 that controls fuel to the fuel circuit 34. As illustrated, at the initial time $t_0$, the first gas control valve 32 is turned off, and thus fuel is not flowing through the first gas control valve 32 to the fuel circuit 34. A second gas control valve 32, whose operation and/or position is represented by a third curve 98, is at least partially open and enables fuel to flow to a corresponding fuel circuit 34. As such, fuel flows to the combustion system 14 via the second gas control valve 32, such that the combustion chamber 42 combusts the fuel. The amount of fuel combusted by the combustion chamber 42 is represented by a fourth curve 100. As illustrated by the fourth curve 100, the fuel flow rate to the combustion system 14 is increased at a constant rate. A fifth curve 102 (representing exhaust temperature) and a sixth curve 104 (representing power output) represent the one or more outputs 72 of the gas turbine system 10. As illustrated by the fifth and sixth curves 102, 104, because the fuel flow rate to the combustion system 14 is increased at a constant rate, the exhaust temperature and the power output of the gas turbine system 10 also increase at a constant rate. A seventh curve 106 represents adjustment of the one or more inputs 80 of the model 70 of the gas turbine system 10.

At time $t_1$, prefilling the fuel circuit 34 coupled to the first gas control valve 32 begins (e.g., based on an instruction sent by the controller 18). As such, between time $t_1$ and time $t_2$ (when the prefill event ends), the controller 18 instructs the first gas control valve 32 to open at a position 107 corresponding to prefilling the fuel circuit 34 (as illustrated in the second curve 96) such that fuel flows into and fills the fuel circuit 34 (as illustrated in the first curve 94). As illustrated, the controller 18 instructs the second gas control valve 32 (as illustrated in the third curve 98) to maintain its operation and/or position during this time period. Because the fuel passing through the first gas control valve 32 flows into the fuel circuit 34 and not yet to the combustion system 14, the amount of fuel combusted by the combustion chamber 42 (as illustrated in the fourth curve 100) remains increasing at a constant rate over this time period, as do the exhaust temperature (as illustrated in the fifth curve 102) and the power output (as illustrated in the sixth curve 104). A difference between a total fuel flow (which includes the fuel filling the fuel circuit 34 and the fuel flowing at the fuel flow rate commanded by the controller 18 to the combustion system 14) and the fuel flowing at the fuel flow rate commanded by the controller 18 to the combustion system 14 is illustrated by the region 108. Until the respective fuel circuit 34 is filled, at time $t_2$, the one or more outputs 72 (e.g., the exhaust temperature and power output) of the gas turbine system 10 are proceeding as modeled, and as such, no adjustments (as illustrated in the seventh curve 106) are made by the model 70.

At time $t_2$, the prefill event ends (e.g., based on an instruction sent by the controller 18), as illustrated in the first curve 94. As such, the controller 18 instructs the first gas control valve 32 to close, thereby stopping prefilling the fuel circuit 34, and more fully open while instructing the second gas control valve 32 to partially close, to provide fuel from both the first and second gas control valves 32 to the combustion system 14. As illustrated, the fuel circuit 34 is prefilled with a target fuel flow rate such that the controller 18 stops prefilling the fuel circuit 34 at approximately the same time that the fuel circuit 34 is completely filled. As illustrated in the time period before time $t_2$, the fuel flowing through the second gas control valve 32 to the combustion system 14 enables the constantly increasing rates of outputs represented by the fifth and sixth curves 102, 104. Because the controller 18 instructs the first gas control valve 32 to close, thereby stopping prefilling the fuel circuit 34, and open more fully while instructing the second gas control valve 32 to partially close at approximately the same time that the fuel circuit 34 is completely filled, the combustion system 14 continues to receive fuel at the constant and target fuel flow rate (as illustrated in the fourth curve 100). As such, the one or more outputs of the gas turbine system 10 (e.g., the exhaust temperature and power output) represented by the fifth and sixth curves 102, 104 increase at a constant rate. The controller 18 receives the constantly increasing rates of the one or more outputs 72 (e.g., the exhaust temperature and power output) of the gas turbine system 10, and maintains the one or more inputs 80 of the model 70 such that the one or more modeled outputs 72 match these one or more measured outputs 72. For example, the controller 18 may maintain a fuel flow rate (as illustrated in the seventh curve 106) such that the decreases in the modeled exhaust temperature and power output (e.g., 72) match the constantly increasing rates of the measured exhaust temperature and power output (e.g., 74) of the gas turbine system 10.

Purging Fuel Circuits

When a fuel circuit 34 is disabled, it may be purged (e.g., with an inert gas) to prevent residual from fuel forming a deposit or otherwise clogging the fuel circuit 34. The purge event is complete when the fuel circuit 34 is empty of fuel via filled with the inert purge gas, which occurs within a finite amount of time.

Figure 8:
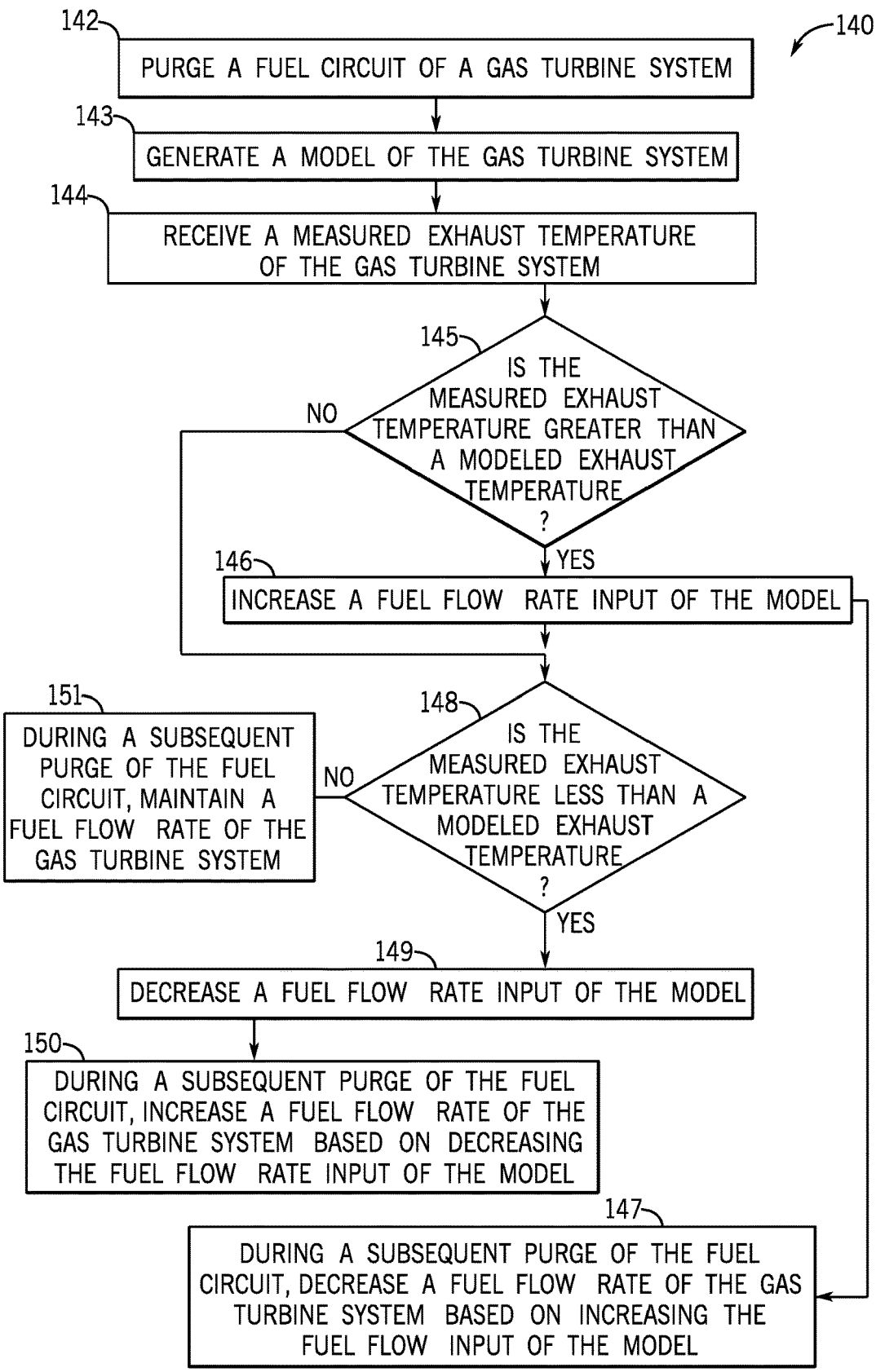
FIG. 8 is a flow diagram of a method for adaptively purging fuel circuits of the power generation system of FIG. 1, in accordance with an embodiment of the present disclosure.

FIG. 8 is a flow diagram of a method 140 for adaptively purging fuel circuits 34 of the gas turbine system 10 of FIG. 1, in accordance with an embodiment of the present disclosure. The method 140 may be performed by any suitable device that may control components of the gas turbine system 10, such as the controller 18. While the method 140 is described using steps in a specific sequence, it should be understood that the present disclosure contemplates that the describe steps may be performed in different sequences than the sequence illustrated, and certain described steps may be skipped or not performed altogether. In some embodiments, the method 140 may be implemented by executing instructions stored in a tangible, non-transitory, computer-readable medium, such as the memory device(s) 20, using a processor, such as the processor(s) 19.

The controller 18 may purge (block 142) a fuel circuit 34 of the gas turbine system. For example, the controller 18 may instruct a corresponding purge valve 36 to open to purge the fuel circuit 34. In some embodiments, more than one fuel circuit 34 may be purged based on the instruction from the controller 18. The controller 18 may instruct the corresponding purge valve 36 to open in response to a request to purge the one or more fuel circuits 34 of the gas turbine system 10. Prior to purging the fuel circuit 34, the controller 18 may instruct a corresponding gas control valve 32 to close such that fuel does not flow to the fuel circuit 34.

The controller 18 may generate (block 143) the model 70 of the gas turbine system 10. The one or more outputs of the gas turbine system 10 may include, but are not limited to, generator or power output, exhaust temperature (e.g., turbine exhaust temperature), compressor condition (e.g., compressor pressure ratio), and the like. The one or more inputs to the gas turbine system 10 may include, for example, and without limitation, fuel flow rate, ambient conditions, angle of the inlet guide vanes 22, amount of fuel flowing to the combustion system 14, rotational speed of the gas turbine system 10, and the like.

As discussed above with respect to the method 50 of FIG. 3, the example model 70 of FIG. 4 may be used for simulating operation of the gas turbine system 10. The model 70 may simulate the one or more outputs of the gas turbine system 10 by outputting the one or more model outputs 72. The one or more inputs 80 to the model 70 may simulate the one or more inputs to the gas turbine system 10, and may include, among other inputs, the fuel flow rate. For example, when using the fuel flow rate as the input to the gas turbine system 10, the one or more inputs 80 to the model 70 may correspondingly include the fuel flow rate.

The controller 18 may receive (block 144) a measured exhaust temperature of the gas turbine system 10. The measured exhaust temperature is used as an example of any one or more measured outputs of the gas turbine system 10, as described above, that may be received by the controller 18. The one or more measured outputs of the gas turbine system 10 may be provided by the sensor(s) 28 of the gas turbine system 10.

The controller 18 may then determine (decision block 145) whether the measured exhaust temperature is greater than a modeled exhaust temperature (e.g., provided by the model 70). In some embodiments, other and/or additional measured outputs of the gas turbine system 10 may be compared to other modeled outputs. Moreover, the controller 18 may also or instead determine whether the measured power output is less than the modeled power output, and compensate for the lesser measured power output using processes similar to those described below.

If the measured exhaust temperature is greater than a modeled exhaust temperature (decision block 145), then the controller 18 may increase (process block 146) a fuel flow rate input of the model. The fuel flow rate input is used as an example of any one or more inputs to the model 70 as described above. For example, the controller 18 may increase the fuel flow rate input of the model such that the modeled exhaust temperature (e.g., 72) more closely matches the measured exhaust temperature (e.g., 74).

As illustrated in FIG. 4, the modeled output(s) 72 and the measured output(s) 74 may be input into an error correction system or filter 76 (e.g., a Kalman filter gain matrix) that automatically and regularly adjusts or tunes the model 70 (e.g., the one or more inputs 80 to the model 70) to more accurately fit the modeled output(s) 72 to the measured output(s) 74 of the gas turbine system 10.

The controller 18 may later receive a request to purge the fuel circuit 34. For example, the fuel circuit 34 may be filled, and it may be desired to once again purge the fuel circuit 34. During this subsequent purge, the controller 18 may decrease (process block 147) a fuel flow rate of the gas turbine system 10 based on increasing the fuel flow input of the model. The fuel flow rate is used as an example of any one or more inputs to the gas turbine system 10 as described above. For example, the controller 18 may instruct one or more gas control valves 32 to at least partially close to decrease the fuel flow rate of the gas turbine system 10 to compensate for the increase in the fuel flow input of the model.

As illustrated in FIG. 4, the filter 76 may output the one or more adjustments 78 that may be applied to the one or more inputs 80 such that the one or more modeled outputs 72 more closely matches the one or more measured outputs 74 of the gas turbine system 10. For example, when using the fuel flow rate as the input to the gas turbine system 10, the one or more adjustments 78 may include a fuel flow rate adjustment that results in decreasing, increasing, or maintaining (e.g., not changing) the fuel flow rate. In some embodiments, the filter 76 may use partial derivative analysis and/or normalization to determine a matrix of optimal tuning or gain values to be applied to the difference signals. The matrix may then generate the one or more adjustments 78.

If the measured exhaust temperature is not greater than the modeled exhaust temperature (decision block 145), then the controller 18 may determine (decision block 148) whether the measured exhaust temperature is less than a modeled exhaust temperature (e.g., provided by the model 70). In some embodiments, other and/or additional measured outputs of the gas turbine system 10 may be compared to other modeled outputs.

If the measured exhaust temperature is less than the modeled exhaust temperature (decision block 148), then the controller 18 may decrease (process block 149) the fuel flow rate input of the model 70. For example, the controller 18 may decrease the fuel flow rate input of the model 70, such that the modeled exhaust temperature more closely matches the modeled exhaust temperature.

The controller 18 may later receive a request to purge the fuel circuit 34. During this subsequent purge, the controller 18 may increase (process block 150) a fuel flow rate of the gas turbine system 10 based on decreasing the fuel flow input of the model.

If the measured exhaust temperature is not less than the modeled exhaust temperature (decision block 148), then the controller 18 may, during the subsequent purge of the fuel circuit 34, maintain (process block 151) the fuel flow rate of the gas turbine system 10. For example, the controller may not instruct the one or more gas control valves 32 to adjust (e.g., increase or decrease) the fuel flow rate, such that the fuel flow rate for the subsequent purge approximately matches the fuel flow rate for the initial purge (as used in process block 142).

In this manner, the controller 18 may adaptively purge the one or more fuel circuits 34 of the gas turbine system 10, such that the purged fuel is accurately compensated for over the life of the gas turbine system 10.

Figure 9:
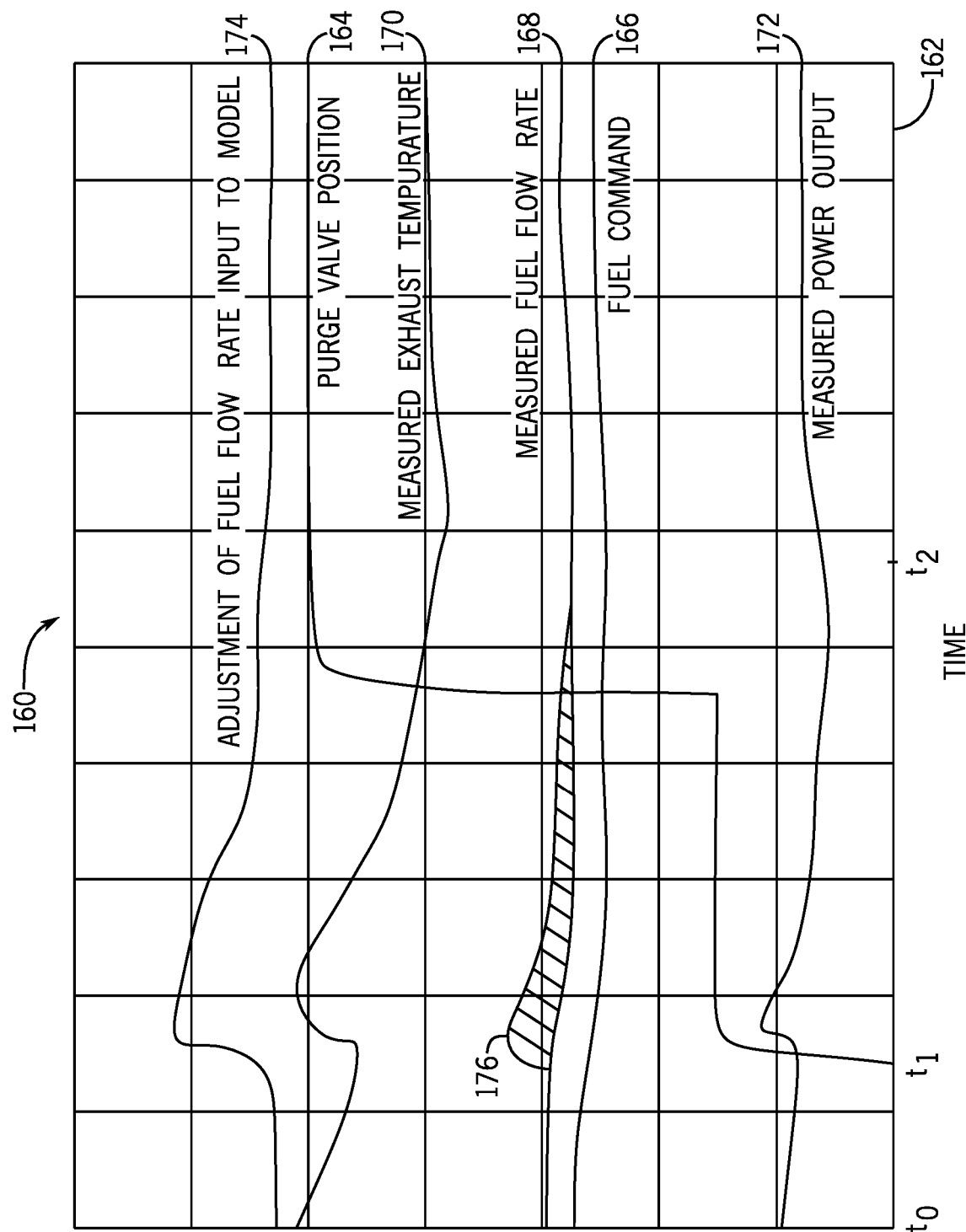
FIG. 9 is a graph of operational characteristics of the power generation system of FIG. 1 when a fuel circuit is purged, in accordance with an embodiment of the present disclosure.

FIG. 9 is a graph 160 of operational characteristics of the gas turbine system 10 of FIG. 1 when purging a fuel circuit 34, in accordance with an embodiment of the present disclosure. The graph 160 illustrates how an adjustment to a fuel flow rate to the gas turbine system 10 is generated to more closely match undesirable increases in measured exhaust temperature and/or power output when the fuel circuit 34 is purged.

The horizontal axis 162 of the graph 160 represents time. A first curve 164 represents operation and/or a position of a purge valve 36 coupled to the fuel circuit 34 that controls inert purge gas to the fuel circuit 34. As illustrated, at an initial time $t_0$, the purge valve 36 is closed. As such, inert purge gas does not flow to the fuel circuit 34, and the fuel circuit 34 is enabled and providing fuel to the fuel circuit 34. Fuel flows from the fuel circuit 34 to the combustion system 14 at a fuel flow rate that is commanded by the controller 18, such that the combustion chamber 42 combusts the fuel. The fuel command is represented by a second curve 166, and the resulting fuel flow rate is represented by a third curve 168. As illustrated, over the timespan represented by the graph 160, the fuel command (as illustrated by the second curve 166) is kept approximately constant between times $t_0$ and $t_1$. As such, the metered or measured fuel flow rate (as illustrated by the third curve 168) that is a result of the fuel command is also approximately constant. A fourth curve 170 (representing exhaust temperature) and a fifth curve 172 (representing power output) represent the one or more outputs 72 of the gas turbine system 10. As illustrated by the fourth and fifth curves 170, 172, because the fuel flow rate to the gas turbine system 10 is approximately constant, the exhaust temperature and the power output of the gas turbine system 10 are also approximately constant. A sixth curve 174 represents adjustment of the one or more inputs 80 (e.g., a fuel flow rate input) of the model 70 of the gas turbine system 10.

At time $t_1$, purging the fuel circuit 34 begins (e.g., based on an instruction sent by the controller 18). As such, between times $t_1$ and $t_2$ (when the fuel circuit 34 is completely purged), the controller 18 instructs the purge valve 36 to open at one or more positions (as illustrated by the first curve 164) corresponding to purging the fuel circuit 34 such that inert purge gas enters and begins to fill the fuel circuit 34. As mentioned above, the purged fuel is not compensated for (e.g., by the controller 18). As such, the purged fuel flow begins to flow to and is combusted in the combustion chamber 42, while the fuel command (as illustrated by the second curve 166) is kept approximately constant. The metered or measured fuel flow rate (as illustrated by the third curve 168) that is a result of the fuel command is also approximately constant. A difference between a total fuel flow (which includes the purged fuel and the fuel flowing at the fuel flow rate commanded by the controller 18) and the fuel flowing at the fuel flow rate commanded by the controller 18 is illustrated by the region 176. That is, the region 176 illustrates the amount of purged fuel that may be compensated for by the controller 18 to avoid the undesirable increases in the exhaust temperature and power output. The additional purged fuel flowing to the combustion system 14 causes an undesired increase in the one or more outputs 72 (e.g., the exhaust temperature and power output) of the gas turbine system 10, as illustrated in the fourth and fifth curves 170, 172. The controller 18 receives the undesired measured increases of the one or more outputs 72 (e.g., the exhaust temperature and power output) of the gas turbine system 10, and adjusts one or more inputs 80 of the model 70 such that the one or more modeled outputs 72 match the undesired one or more measured outputs 72. For example, the controller 18 may increase (as illustrated by the sixth curve 174) a fuel flow rate input (e.g., 80) to the model 70 such that the increases in the modeled exhaust temperature and power output (e.g., 72) match the undesired increases of the measured exhaust temperature and power output (e.g., 74) of the gas turbine system 10. In some embodiments, the increases to the one or more measured outputs 74 may be received from the one or more sensors 28.

At time $t_2$, the fuel circuit 34 is completely purged (as illustrated in the first curve 164). As such, there is no longer a difference (as illustrated by the region 176) between the total fuel flow and the fuel flowing at the fuel flow rate commanded by the controller 18. Without additional fuel flowing to the combustion system 14 as a result of purging the fuel circuit 34, the one or more outputs 72 (e.g., the exhaust temperature and power output) of the gas turbine system 10 return to their original constant values, as illustrated in the fourth and fifth curves 170, 172. The controller 18 receives the constant values of the one or more outputs 72 (e.g., the exhaust temperature and power output) of the gas turbine system 10, and adjusts (as illustrated by the sixth curve 174) the one or more inputs 80 of the model 70 such that the one or more outputs 72 (e.g., the exhaust temperature and power output) of the model 70 return to their original constant value.

Based on the adjustments made to the one or more inputs 80 (e.g., the fuel flow rate) of the model 70, the controller 18 may adjust a subsequent purge event of the fuel circuit 34. For example, during the next purge of the fuel circuit 34, the controller 18 may decrease the fuel flow rate between times $t_1$ and $t_2$ based on adjustments made to decrease a fuel flow rate input (e.g., 80) to the model 70 to compensate for the increase in fuel provided to the combustion system 14 due to the purge event. In this manner, the controller 18 may adaptively purge the fuel circuit 34 of the gas turbine system 10, such that the purged fuel may be adaptively compensated for over the life of the gas turbine system 10.

Figure 10:
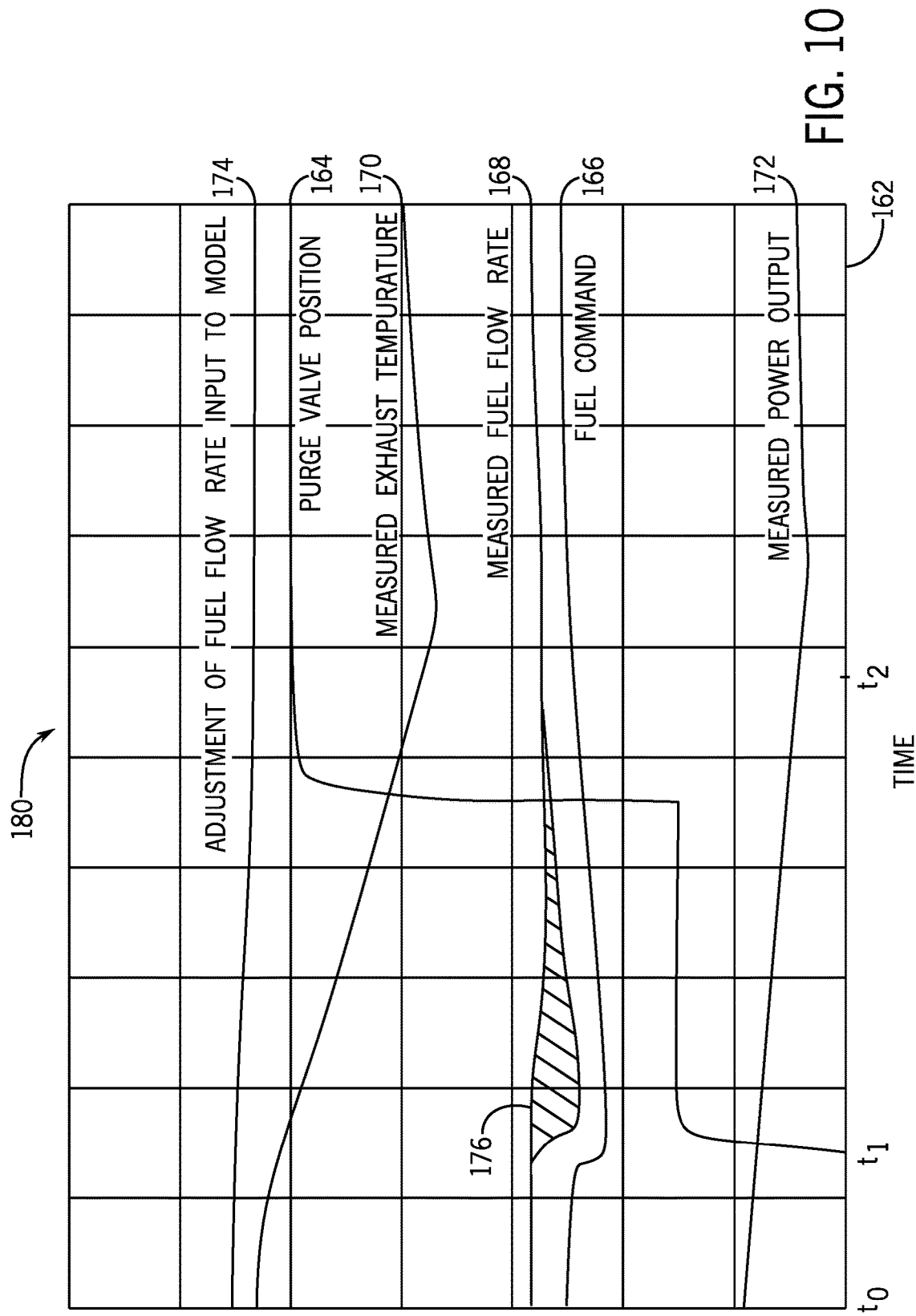
FIG. 10 is a graph of operational characteristics of the power generation system of FIG. 1 when a fuel circuit is purged and the power generation system compensates for the purged fuel, in accordance with an embodiment of the present disclosure.

FIG. 10 is a graph 180 of operational characteristics of the gas turbine system 10 of FIG. 1 when purging a fuel circuit 34 and the gas turbine system 10 compensates for the purged fuel, in accordance with an embodiment of the present disclosure. The graph 180 may represent a subsequent purge of the fuel circuit 34 after the controller 18 has adjusted the fuel flow rate based on a previous purge of the fuel circuit 34. The horizontal axis 162 of the graph 180 represents time.

A first curve 164 represents operation and/or a position of a purge valve 36 coupled to the fuel circuit 34 that controls inert purge gas to the fuel circuit 34. As illustrated, at an initial time to, the purge valve 36 is closed. As such, inert purge gas does not flow to the fuel circuit 34, and the fuel circuit 34 is enabled and providing fuel to the fuel circuit 34. Fuel flows from the fuel circuit 34 to the combustion system 14 at a fuel flow rate that is commanded by the controller 18, such that the combustion chamber 42 combusts the fuel. The fuel command is represented by a second curve 166, and the resulting fuel flow rate is represented by a third curve 168. A fourth curve 170 (representing exhaust temperature) and a fifth curve 172 (representing power output) represent the one or more outputs 72 of the gas turbine system 10. A sixth curve 174 represents adjustment of the one or more inputs 80 of the model 70 of the gas turbine system 10.

At time $t_1$, purging the fuel circuit 34 begins (e.g., based on an instruction sent by the controller 18). As such, between times $t_1$ and $t_2$ (when the fuel circuit 34 is completely purged), the controller 18 instructs the purge valve 36 to open at one or more positions (as illustrated by the first curve 164) corresponding to purging the fuel circuit 34 such that inert purge gas enters and begins to fill the fuel circuit 34. As mentioned above, the purged fuel is compensated for (e.g., by the controller 18). The purged fuel begins to flow to and is combusted in the combustion chamber 42, while the controller 18 issues a fuel command to decrease (as illustrated by the second curve 166) the fuel flow rate to the combustion chamber 42. As such, the metered or measured fuel flow rate (as illustrated by the third curve 168) that is a result of the fuel command is decreased. A difference between a total fuel flow (which includes the purged fuel and the fuel flowing at the fuel flow rate commanded by the controller 18) and the fuel flowing at the fuel flow rate commanded by the controller 18 is illustrated by the region 176. Because the additional purged fuel is compensated for by reducing the fuel flow rate, the one or more outputs 72 (e.g., the exhaust temperature and power output) of the gas turbine system 10 remain approximately constant, as illustrated in the fourth and fifth curves 170, 172. The controller 18 receives the approximately constant values of the one or more outputs 72 (e.g., the exhaust temperature and power output) of the gas turbine system 10, and may maintain (as illustrated by the sixth curve 174) the one or more inputs 80 of the model 70 without adjustment.

At time $t_2$, the fuel circuit 34 is completely purged (as illustrated in the first curve 164). As such, there is no longer a difference (as illustrated by the region 176) between the total fuel flow and the fuel flowing at the fuel flow rate commanded by the controller 18. Without additional fuel flowing to the combustion system 14 as a result of purging the fuel circuit 34, the fuel command (as illustrated by the second curve 166) returns to its original, pre-purge event state. As such, the one or more outputs 72 (e.g., the exhaust temperature and power output) of the gas turbine system 10 return to their original constant values, as illustrated in the fourth and fifth curves 170, 172. The controller 18 receives the constant values of the one or more outputs 72 (e.g., the exhaust temperature and power output) of the gas turbine system 10, and maintains (as illustrated by the sixth curve 174) the one or more inputs 80 of the model 70 without adjustment. In this manner, the controller 18 may adaptively purge the fuel circuit 34 of the gas turbine system 10, such that the purged fuel may be adaptively compensated for over the life of the gas turbine system 10.

Figure 11:
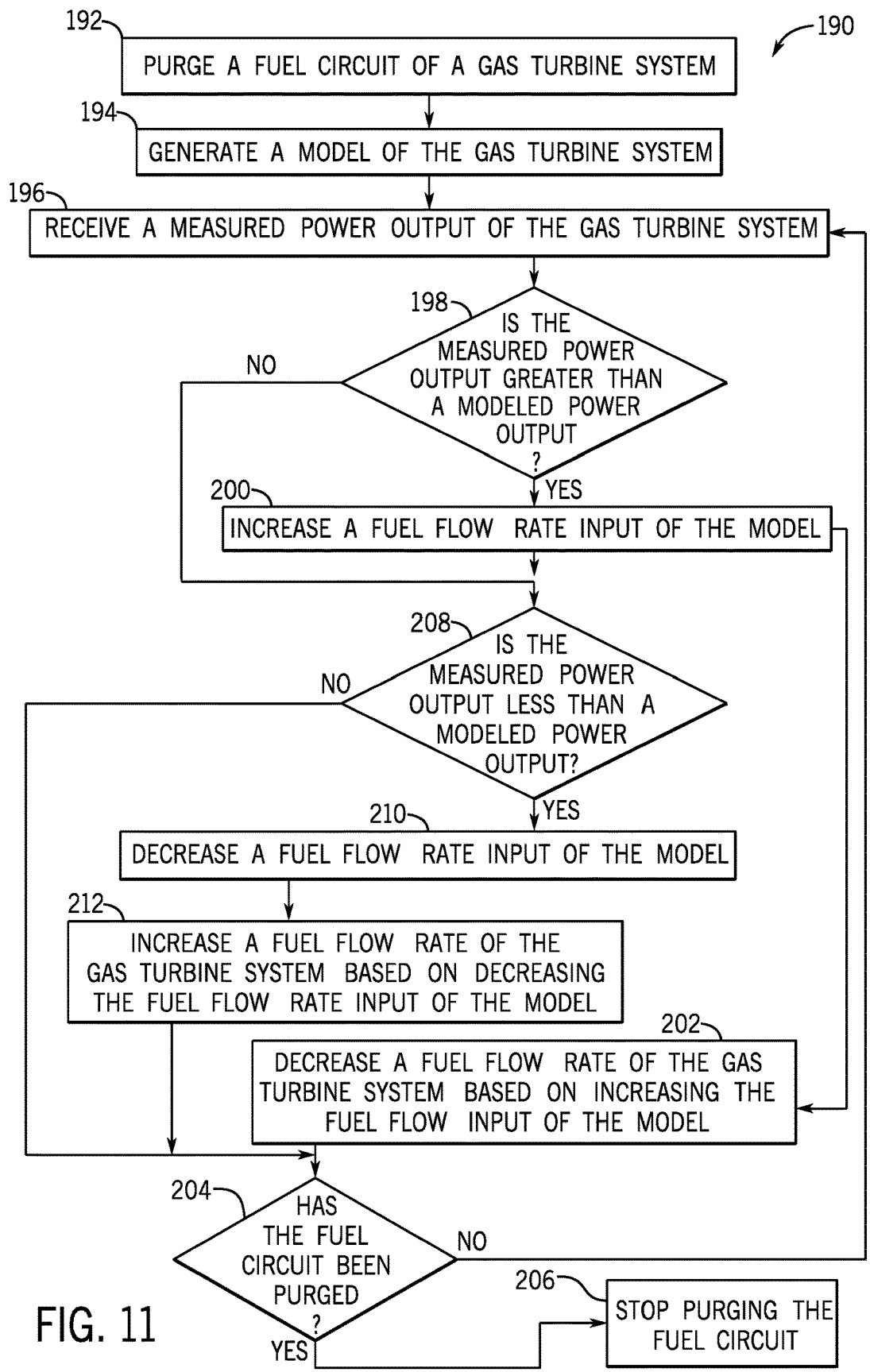
FIG. 11 is a flow diagram of a method for adaptively purging fuel circuits of the power generation system of FIG. 1, in accordance with an embodiment of the present disclosure.

In some embodiments, the controller 18 may adjust the one or more inputs to the gas turbine system 10 to compensate for the purged fuel in real time. For example, if the one or more outputs 72 (e.g., the exhaust temperature and power output) of the gas turbine system 10 change (e.g., increase or decrease), the controller 18 may change (e.g., decrease or increase, respectively) the commanded fuel flow rate in real time to compensate for the purged fuel. FIG. 11 is a flow diagram of a method 190 for adaptively purging fuel circuits 34 of the gas turbine system 10 of FIG. 1, in accordance with an embodiment of the present disclosure. The method 190 may be performed by any suitable device that may control components of the gas turbine system 10, such as the controller 18. While the method 190 is described using steps in a specific sequence, it should be understood that the present disclosure contemplates that the describe steps may be performed in different sequences than the sequence illustrated, and certain described steps may be skipped or not performed altogether. In some embodiments, the method 190 may be implemented by executing instructions stored in a tangible, non-transitory, computer-readable medium, such as the memory device(s) 20, using a processor, such as the processor(s) 19.

The controller 18 may purge (block 192) a fuel circuit 34 of the gas turbine system 10. For example, the controller 18 may instruct a corresponding purge valve 36 to open to purge the fuel circuit 34. In some embodiments, more than one fuel circuit 34 may be purged based on the instruction from the controller 18. The controller 18 may instruct one or more purge valves 36 in response to a request to purge the one or more fuel circuits 34 of the gas turbine system 10. Prior to purging the fuel circuit 34, the controller 18 may instruct a corresponding gas control valve 32 to close such that fuel does not flow to the fuel circuit 34.

The controller 18 may generate (block 194) the model 70 of the gas turbine system 10. The one or more outputs of the gas turbine system 10 may include, but are not limited to, generator or power output, exhaust temperature (e.g., turbine exhaust temperature), compressor condition (e.g., compressor pressure ratio), and the like. The one or more inputs to the gas turbine system 10 may include, for example, and without limitation, fuel flow rate, ambient conditions, angle of the inlet guide vanes 22, amount of fuel flowing to the combustion system 14, rotational speed of the gas turbine system 10, and the like.

As discussed above with respect to the method 50 of FIG. 3, the example model 70 of FIG. 4 may be used for simulating operation of the gas turbine system 10. The model 70 may simulate the one or more outputs of the gas turbine system 10 by outputting the one or more model outputs 72. The one or more inputs 80 to the model 70 may simulate the one or more inputs to the gas turbine system 10, and may include, among other inputs, the fuel flow rate. For example, when using the fuel flow rate as the input to the gas turbine system 10, the one or more inputs 80 to the model 70 may correspondingly include the fuel flow rate.

The controller 18 may receive (block 196) a measured power output of the gas turbine system 10. The measured power output is used as an example of any one or more measured outputs of the gas turbine system 10, as described above, that may be received by the controller 18. The one or more measured outputs of the gas turbine system 10 may be provided by the sensor(s) 28 of the gas turbine system 10.

The controller 18 may then determine (decision block 198) whether the measured power output is greater than a modeled power output (e.g., provided by the model 70). In some embodiments, other and/or additional measured outputs of the gas turbine system 10 may be compared to other modeled outputs. Moreover, the controller 18 may also or instead determine whether the measured power output is less than the modeled power output, and compensate for the lesser measured power output using processes similar to those described below.

If the measured power output is greater than a modeled power output (decision block 198), then the controller 18 may increase (process block 200) a fuel flow rate input of the model. The fuel flow rate input is used as an example of any one or more inputs to the model 70 as described above. For example, the controller 18 may increase the fuel flow rate input of the model such that the modeled power output (e.g., 72) more closely matches the modeled power output (e.g., 74).

As illustrated in FIG. 4, the modeled output(s) 72 and the measured output(s) 74 may be input into an error correction system or filter 76 (e.g., a Kalman filter gain matrix) that automatically and regularly adjusts or tunes the model 70 (e.g., the one or more inputs 80 to the model 70) to more accurately fit the modeled output(s) 72 to the measured output(s) 74 of the gas turbine system 10.

The controller 18 may then decrease (process block 202) a fuel flow rate of the gas turbine system 10 based on increasing the fuel flow input of the model. This may occur while purging the fuel circuit (process block 192). The fuel flow rate is used as an example of any one or more inputs to the gas turbine system 10 as described above. For example, the controller 18 may instruct one or more gas control valves to at least partially close to decrease the fuel flow rate of the gas turbine system 10 to compensate for the increase in the fuel flow input of the model.

As illustrated in FIG. 4, the filter 76 may output the one or more adjustments 78 that may be applied to the one or more inputs 80 such that the one or more modeled outputs 72 more closely matches the one or more measured outputs 74 of the gas turbine system 10. For example, when using the fuel flow rate as the input to the gas turbine system 10, the one or more adjustments 78 may include a fuel flow rate adjustment that results in decreasing, increasing, or maintaining (e.g., not changing) the fuel flow rate. In some embodiments, the filter 76 may use partial derivative analysis and/or normalization to determine a matrix of optimal tuning or gain values to be applied to the difference signals. The matrix may then generate the one or more adjustments 78.

The controller 18 may then determine (decision block 204) whether the fuel circuit 34 has been purged. For example, the controller 18 may receive sensor information from the sensor(s) 28 of the gas turbine system 10 that indicate whether the fuel circuit 34 has been purged. If not, the controller 18 returns to process block 196. If the controller 18 determines (decision block 204) that the fuel circuit 34 has been purged, the controller 18 may stop (process block 206) purging the fuel circuit 34. For example, the controller 18 may send an instruction to stop purging the fuel circuit 34.

If the measured power output is not greater than a modeled power output (decision block 198), then the controller 18 may determine (decision block 208) whether the measured power output is less than a modeled power output (e.g., provided by the model 70). In some embodiments, other and/or additional measured outputs of the gas turbine system 10 may be compared to other modeled outputs.

If the measured power output is less than the modeled exhaust temperature (decision block 208), then the controller 18 may decrease (process block 210) the fuel flow rate input of the model 70. For example, the controller 18 may decrease the fuel flow rate input of the model 70, such that the modeled power output more closely matches the modeled power output.

The controller 18 may then increase (process block 212) a fuel flow rate of the gas turbine system 10 based on decreasing the fuel flow input of the model. This may occur while purging the fuel circuit (process block 192). The fuel flow rate is used as an example of any one or more inputs to the gas turbine system 10 as described above. For example, the controller 18 may instruct one or more gas control valves to at least partially close to decrease the fuel flow rate of the gas turbine system 10 to compensate for the increase in the fuel flow input of the model. The controller 18 may then determine (decision block 204) whether the fuel circuit 34 has been purged.

If the measured power output is not less than the modeled power output (decision block 208), then the controller 18 may proceed to decision block 204. In this manner, the controller 18 may adaptively purge the one or more fuel circuits 34 of the gas turbine system 10 in real time, such that the purged fuel is accurately compensated for over the life of the gas turbine system 10.

Technical effects of the subject matter disclosed herein include, but are not limited to, systems and methods for adaptively purging one or more fuel circuits of a power generation system, such that fuel purged from the one or more fuel circuits may be accurately compensated for. A purge event may include positioning and/or operating one or more purge valves coupled to the one or more fuel circuits to enable inert purge gas to pass through the one or more control valves and purge fuel from the one or more fuel circuits. The purge event may be evaluated using a model of the power generation system. The model may include one or more inputs that may be adaptively adjusted to more closely match one or more outputs of the model to one or more measured outputs of the power generation system. Adaptively adjusting the one or more inputs to the model during the purge event may provide, in real time, a basis for an adjustment to the fuel flow rate to compensate for the purged fuel received at a combustion system of the power generation system. The adjustment may then be used to compensate for the purged fuel, reducing the likelihood of providing excessive fuel to the combustion system, which may result in power generation inefficiency.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A gas turbine system comprising:
a plurality of gas control valves, each gas control valve of the plurality of gas control valves coupled to a fuel supply;
a plurality of purge valves, each purge valve of the plurality of purge valves coupled to a purge gas supply;
a plurality of fuel circuits, wherein each fuel circuit of the plurality of fuel circuits is coupled to a respective purge valve of the plurality of purge valves;
a gas turbine configured to operate based on fuel received via the plurality of fuel circuits; and
a processor communicatively coupled to the plurality of purge valves, wherein the processor is configured to:
transmit a first set of instructions to a set of purge valves of the plurality of purge valves to open to a first position, thereby purging one or more fuel circuits of the plurality of fuel circuits by filling the one or more fuel circuits with purge gas, wherein the one or more fuel circuits initially contain fuel;
generate a model of the gas turbine system that simulates one or more modeled outputs of the gas turbine system based on one or more model inputs corresponding to one or more measured inputs to the gas turbine system;
receive one or more measured outputs of the gas turbine system after the set of purge valves open to the first position;
adjust the one or more model inputs to match the one or more measured outputs when the one or more measured outputs are not approximately equal to the one or more modeled outputs; and
transmit a second set of instructions to the set of purge valves to open during a subsequent purge operation and a set of gas control valves of the plurality of gas control valves to open to a second position or at least partially close during the subsequent purge operation based at least in part on adjusting the one or more model inputs.

2. The gas turbine system of claim 1, comprising one or more sensors communicatively coupled to the processor, wherein the one or more sensors are configured to acquire the one or more measured outputs of the gas turbine system.

3. The gas turbine system of claim 2, wherein the one or more sensors comprise a temperature sensor and the one or more measured outputs comprise an exhaust temperature of the gas turbine system.

4. The gas turbine system of claim 3, wherein the one or more sensors comprise a power sensor and the one or more measured outputs comprise an output power of the gas turbine system.

5. The gas turbine system of claim 1, wherein the one or more measured inputs comprises fuel flow rate to the gas turbine system.

6. The gas turbine system of claim 1, wherein the second set of instructions is configured to cause the set of gas control valves to at least partially close to compensate for fuel injected into the gas turbine from purging the one or more fuel circuits via the first set of instructions.

7. A method comprising:
instructing, via one or more processors, a set of purge valves of a plurality of purge valves of a gas turbine system to open to a first position, thereby purging one or more fuel circuits of a plurality of fuel circuits of the gas turbine system by filling the one or more fuel circuits with purge gas, wherein the one or more fuel circuits initially contain fuel;
generating, via the one or more processors, a model of the gas turbine system that simulates one or more modeled outputs of the gas turbine system based on one or more model inputs corresponding to one or more measured inputs to the gas turbine system;
receiving, via the one or more processors, one or more measured outputs of the gas turbine system;
adjusting, via the one or more processors, the one or more model inputs such that the one or more modeled outputs more closely matches the one or more measured outputs when the one or more measured outputs is not approximately equal to the one or more modeled outputs; and
instructing, via the one or more processors, the set of purge valves to open during a subsequent purge operation and a set of gas control valves of a plurality of gas control valves to open to a second position or at least partially close during the subsequent purge operation based at least in part on adjusting the one or more model inputs.

8. The method of claim 7, comprising determining, via the one or more processors, whether the one or more measured outputs is greater than the one or more modeled outputs.

9. The method of claim 8, wherein adjusting, via the one or more processors, the one or more model inputs comprises increasing, via the one or more processors, the one or more model inputs based on an amount in which the one or more modeled outputs is greater than the one or more measured outputs.

10. The method of claim 9, wherein instructing, via the one or more processors, the set of purge valves to open during the subsequent purge operation and the set of gas control valves to open to the second position or at least partially close during the subsequent purge operation, comprises instructing, via the one or more processors, the set of gas control valves to at least partially close, thereby decreasing the one or more measured inputs, based on increasing the one or more model inputs.

11. The method of claim 7, wherein instructing, via the one or more processors, the set of purge valves to open during the subsequent purge operation and the set of gas control valves to open to the second position or at least partially close during the subsequent purge operation, comprises instructing, via the one or more processors, the set of gas control valves to at least partially close to compensate for fuel injected into a gas turbine of the gas turbine system from purging the one or more fuel circuits.

12. The method of claim 7, wherein the model is an adaptive real-time engine simulation model.

13. The method of claim 7, comprising instructing, via the one or more processors, the set of purge valves to close to stop purging the one or more fuel circuits of the plurality of fuel circuits.

14. The method of claim 7, wherein the one or more measured inputs comprises fuel flow rate to the gas turbine system.

15. One or more tangible, non-transitory, machine-readable media comprising instructions configured to cause a processor to:
instruct a set of purge valves of a plurality of purge valves of a gas turbine system to open to a first position, thereby purging one or more fuel circuits of a plurality of fuel circuits of the gas turbine system by filling the one or more fuel circuits with purge gas, wherein the one or more fuel circuits initially contain fuel;

generate a model of the gas turbine system that simulates one or more modeled outputs of the gas turbine system based on one or more model inputs corresponding to one or more measured inputs to the gas turbine system;

receive one or more measured outputs of the gas turbine system;

adjust the one or more model inputs to match the one or more measured outputs when the one or more measured outputs is not approximately equal to the one or more modeled outputs; and instruct the set of purge valves to open and a set of gas control valves of a plurality of gas control valves to open to second position or at least partially close based at least in part on adjusting the one or more model inputs.

16. The one or more machine-readable media of claim 15, wherein instructing the set of purge valves to open and the set of gas control valves to open to the second position or at least partially close occurs while the one or more fuel circuits are purged.

17. The one or more machine-readable media of claim 16, comprising determining whether the one or more measured outputs is less than the one or more modeled outputs.

18. The one or more machine-readable media of claim 17, wherein adjusting the one or more model inputs comprises decreasing the one or more model inputs based on an amount in which the one or more modeled outputs is less than the one or more measured outputs.

19. The one or more machine-readable media of claim 15, comprising determining whether the one or more fuel circuits of the plurality of fuel circuits has been purged.

* * * * *